US011553359B2

(12) United States Patent
Abdel Shahid

(10) Patent No.: US 11,553,359 B2
(45) Date of Patent: Jan. 10, 2023

(54) COMMON NETWORK RESOURCE ALLOCATION FOR MATCHING DATA

(71) Applicant: T-Mobile USA, Inc., Bellevue, WA (US)

(72) Inventor: Wafik Abdel Shahid, Kenmore, WA (US)

(73) Assignee: T-Mobile USA, Inc., Bellevue, WA (US)

(*) Notice: Subject to any disclaimer, the term of this patent is extended or adjusted under 35 U.S.C. 154(b) by 153 days.

(21) Appl. No.: 16/825,212

(22) Filed: Mar. 20, 2020

(65) Prior Publication Data
US 2020/0221326 A1    Jul. 9, 2020

Related U.S. Application Data

(63) Continuation of application No. 15/229,689, filed on Aug. 5, 2016, now Pat. No. 10,623,972.

(51) Int. Cl.
H04W 24/08    (2009.01)
H04W 72/12    (2009.01)
(Continued)

(52) U.S. Cl.
CPC ......... H04W 24/08 (2013.01); H04W 72/042 (2013.01); H04W 72/121 (2013.01); H04W 76/11 (2018.02); H04W 72/1226 (2013.01)

(58) Field of Classification Search
CPC ... H04W 72/04; H04W 84/12; H04W 72/042; H04W 72/0453; H04W 72/0406;
(Continued)

(56) References Cited

U.S. PATENT DOCUMENTS

2003/0235171 A1    12/2003 Lundstrom et al.
2010/0005312 A1    1/2010 Rom et al.
(Continued)

FOREIGN PATENT DOCUMENTS

CN    103828460 A    5/2014
WO    WO2014169488 A1    10/2014
WO    WO2015143650 A1    10/2015

OTHER PUBLICATIONS

"3GPP TS 36.101 V11.0.0" 3rd Generation Partnership Project; Technical Specification Group Radio Access Network; Evolved Universal Terrestrial Radio Access (E-UTRA); User Equipment (UE) ration transmission and reception (Release 11), Apr. 2012, pp. 1-12, 20-21, 155-160.
(Continued)

Primary Examiner — Khaled M Kassim
Assistant Examiner — Najeeb Ansari
(74) Attorney, Agent, or Firm — Lee & Hayes, P.C.

(57) ABSTRACT

In some implementations, a radio access provider (RAP), e.g., of a wireless telecommunications network, can identifying matching data in two data flows associated with respective, different terminals. The RAP can determine a common wireless-resource allocation for the matching data, and respective allocation messages for the terminals. Each allocation message can indicate the common resource allocation. The RAP can transmit the allocation messages to the terminals. In some implementations, a wireless communications device can receive two allocation messages, one for a common and one for a terminal-specific resource allocation. The device can receive the common-allocation data before the terminal-specific data, and assemble a packet with at least some of the terminal-specific data before some of the common-allocation data. The device can decrypt the com-
(Continued)

mon-allocation data using a key associated with the common allocation.

20 Claims, 12 Drawing Sheets

(51) Int. Cl.
*H04W 76/11* (2018.01)
*H04W 72/04* (2009.01)

(58) Field of Classification Search
CPC ........... H04W 74/006; H04W 74/0816; H04W 76/11; H04W 76/15; H04W 72/0413; H04W 72/1289; H04W 88/08; H04W 48/12; H04L 5/0053; H04L 5/0044; H04L 5/0094; H04L 5/001
See application file for complete search history.

(56) References Cited

U.S. PATENT DOCUMENTS

| | | | |
|---|---|---|---|
| 2010/0281051 | A1 | 11/2010 | Sheffi et al. |
| 2012/0069809 | A1 | 3/2012 | Aminaka et al. |
| 2012/0182977 | A1 | 7/2012 | Hooli et al. |
| 2015/0289253 | A1 | 10/2015 | Pan et al. |
| 2015/0304378 | A1* | 10/2015 | Bi ..................... H04L 65/4076 370/329 |
| 2016/0057585 | A1 | 2/2016 | Horn et al. |
| 2016/0212667 | A1 | 7/2016 | Kim et al. |
| 2016/0227517 | A1 | 8/2016 | Han |
| 2017/0150227 | A1 | 5/2017 | Kim et al. |
| 2017/0231029 | A1 | 8/2017 | Pelletier et al. |
| 2017/0325117 | A1 | 11/2017 | Li et al. |
| 2017/0359834 | A1 | 12/2017 | Wang et al. |
| 2018/0042009 | A1 | 2/2018 | Abdel Shahid |
| 2018/0249479 | A1 | 8/2018 | Cho et al. |
| 2018/0376423 | A1* | 12/2018 | Atefi ................. H04W 52/0216 |
| 2019/0124650 | A1* | 4/2019 | Sun ................... H04W 72/0446 |
| 2019/0174554 | A1* | 6/2019 | Deenoo .............. H04W 56/001 |

OTHER PUBLICATIONS

"3GPP TS 36.829 V11.0.0" 3rd Generation Partnership Project; Technical Specification Group Radio Access Network; Enhanced performance requirement for LTE User Equipment (UE) (Release 11), Apr. 2012, pp. 1-5, 8-12, 22, 41-43, 79-83.

"3rd Generation Patnership Project; Technical Specification Group Services and System Aspects; Multimedia Broadcast/Multicast Service (MBMS); Architecture and functional description (Release 13)", 3GPP Standard; Technical Specification; vol. SA WG2, No. V13.3.0, 3GPP TS 23.246, 3rd Generation Partnership Project (3GPP), Mobile Competence Centre; 650, Routes Des Lucioles, France, Dec. 15, 2015, pp. 1-68.

Abeta, "LTE Radio Physical Layer", available at: <<http://www.3gpp.opg/ftp/information/presentations/presentations_2011/2011_05_Bangalore/2011_Bangalore_RAN1_r1.pdf>>, May 30, 2011, 37 pages.

Alfarhan, Faris, "An Evaluation of LTE Frequency Selective Scheduling," retrieved on Nov. 28, 2015 at <<http://frankrayal.com/2013/10/09/an-evaluation-of-lte-frequency-selective-scheduling/>>, Frank Rayal, published Oct. 9, 2013, pp. 1-4.

Bui, et al., "OWL: a Reliable Online Watcher for LTE Control Channel Measures", available at: <<http://arxiv.org/abs/1606.00202>>, Jun. 1, 2016, 6 pages.

Capozzi, et al., "Downlink Packet Scheduling in LTE Cellular Networks: Key Design Issues and a Survey", in the Proceedings of IEEE Communications Surveys & Tutorials, vol. 15, Iss. 2, May 2, 2013, 52 pages.

The Partial Supplementary European Search Report dated Jan. 31, 2020 for European Patent Application No. 17837407.0, 23 pages.

"ETSI TS 136 322 V13.1.0," Apr. 2016, pp. 1, 3, 4, 7-13, 22-25, and 34, 36-39.

Hamalainen, Jyri, "Cellular Network Planning and Optimization Part V: GSM," Communications and Networking Department, Helsinki University of Technology, Jan. 18, 2008, pp. 1-32.

Ku, "Scheduling in LTE", in the Proceedings of Adaptive Signal Processing and Information Theory Research Group, Apr. 27, 2012, 22 pages.

"LTE; Evolved Universal Terrestrial Radio Access (E-UTRA); Radio Resource Control (RRC); Protocol specification", 3GPP Technical Specification, V13.1.0, Apr. 2016, pp. 1-29, 45-48.

"LTE; Evolved Universal Terrestrial Radio Access (E-UTRA); Medium Access Control (MAC) protocol specification", 3GPP Technical Specification, V13.1.0, Apr. 2016, pp. 1-17, 54-56.

"LTE; Evolved Universal Terrestrial Radio Access (E-UTRA) and Evolved Universal Terrestrial Radio Access Network (E-UTRAN); Overall description;", 3GPP Technical Specification, V13.3.0, Apr. 2016, pp. 1-29, 51-77, 125-149, 158-162, 269.

"LTE; Evolved Universal Terrestrial Radio Access (E-UTRA); Multiplexing and channel coding", 3GPP Technical Specification, V13.1.0, Apr. 2016, pp. 1-24, 94-120.

"LTE; Evolved Universal Terrestrial Radio Access (E-UTRA); Physical channels and modulation", 3GPP Technical Specification, V13.1.0, Apr. 2016, pp. 1-20, 55-58, 66-92, 104-115.

"LTE; Evolved Universal Terrestrial Radio Access (E-UTRA); LTE physical layer; General description", 3GPP Technical Specification, V13.1.0, Apr. 2016, pp. 1-17, 54-56.

"LTE; Evolved Universal Terrestrial Radio Access (E-UTRA); Physical layer procedures", 3GPP Technical Specification, V13.1.1, 2015, pp. 1-6, 50-68, 233-254.

Office Action for U.S. Appl. No. 15/229,689, dated Jan. 11, 2018, Shahid, "Common Network Resource Allocation for Matching Data", 17 pages.

Office Action for U.S. Appl. No. 15/229,689, dated Feb. 25, 2019, Shahid, "Common Network Resource Allocation for Matching Data", 18 pages.

Office Action for U.S. Appl. No. 15/229,689, dated Aug. 10, 2018, Wafik Abdel Shahid, "Common Network Resource Allocation for Matching Data", 21 pages.

Office Action for U.S. Appl. No. 15/229,689, dated Aug. 22, 2019, Shahid, "Common Network Resource Allocation for Matching Data", 20 pages.

Pasupuleti, "RNTIs in LTE", retrieved on Jun. 16, 2016, available at <<http://howltestuffworks.blogspot.com/2014/06/rntisinlte.html>>, 5 pages.

PCT Search Report and Written Opinion dated Oct. 16, 2017 for PCT Application No. PCT/US17/43796, 12 pages.

Sun, et al., "A Configurable Dual-Mode Algorithm on Delay-Aware Low-Computation Scheduling and Resource Allocation in LTE Downlink," 2012 IEEE Wireless Communications and Networking Conference: MAC and Cross-Layer Design, 2012, pp. 1444-1449.

The Extended European Search Report dated Jun. 25, 2020 for European Patent Application No. 17837407.0, 16 pages.

Chinese Office Action dated Aug. 19, 2022 for Chinese Patent Application No. 201780048606.4, a foreign counterpart to U.S. Pat. No. 10,623,972, 22 pages.

* cited by examiner

COMMON NETWORK RESOURCE ALLOCATION FOR MATCHING DATA

CROSS-REFERENCE TO RELATED APPLICATION

This application is a continuation of U.S. patent application Ser. No. 15/229,689 entitled "Common Network Resource Allocation for Matching Data," filed Aug. 5, 2016, which is expressly incorporated herein by reference in its entirety.

BACKGROUND

Conventional wireless devices are designed to work or operate in a specified frequency range or band with limited transmit power levels. Government agencies, e.g., the U.S. Federal Communications Commission (FCC), license specific bands to specific network operators. The FCC limits transmit power for each of the licensed bands to provide public safety and to reduce potential co-band and adjacent band interference levels. Therefore, each band has a limited capacity for data transmission. Moreover, licensees to a licensed band usually have an exclusive right to provide services with the band in a specified geographic area, for a defined term and within specified times. The license is exclusive in the sense that no other service providers are typically allowed to provide services in the same band, in the same area and at the same time.

Example licensed frequency bands include cellular telephony or Personal Communication Service (PCS) bands, as well as Advanced Wireless Services (AWS) bands, Global System for Mobile Communications (GSM) bands, and other bands, such as those supporting Third Generation (3G) wireless communications. Other licensed bands include, but are not limited to, a licensed band identified as allocated for Worldwide Interoperability for Microwave Access (WIMAX).

Many wireless networks provide communication services to multiple types or generations of devices. For example, a cellular network may provide connectivity to second-generation (2G) cellular devices using, e.g., the GSM standard, 3G cellular devices using, e.g., the Universal Mobile Telecommunications System (UMTS) standard, or fourth-generation (4G) cellular networks using, e.g., the Long Term Evolution (LTE) standard. Within the any particular cell of such a network, cellular devices may be operating using multiple network types or standards. Moreover, a particular cellular device may switch between network types in operation, e.g., due to a handover operation, e.g., single-radio voice call continuity (SRVCC) when leaving LTE coverage during a call but still within GSM coverage. As a result, the demand for data-transmission resources within a particular cell may change rapidly or unexpectedly over time.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items.

For brevity of illustration, in the diagrams herein, an arrow beginning with a diamond connects a first component or operation (at the diamond end) to at least one second component or operation that is or can be included in the first component or operation in at least one example.

DETAILED DESCRIPTION

Overview

Figure 1:
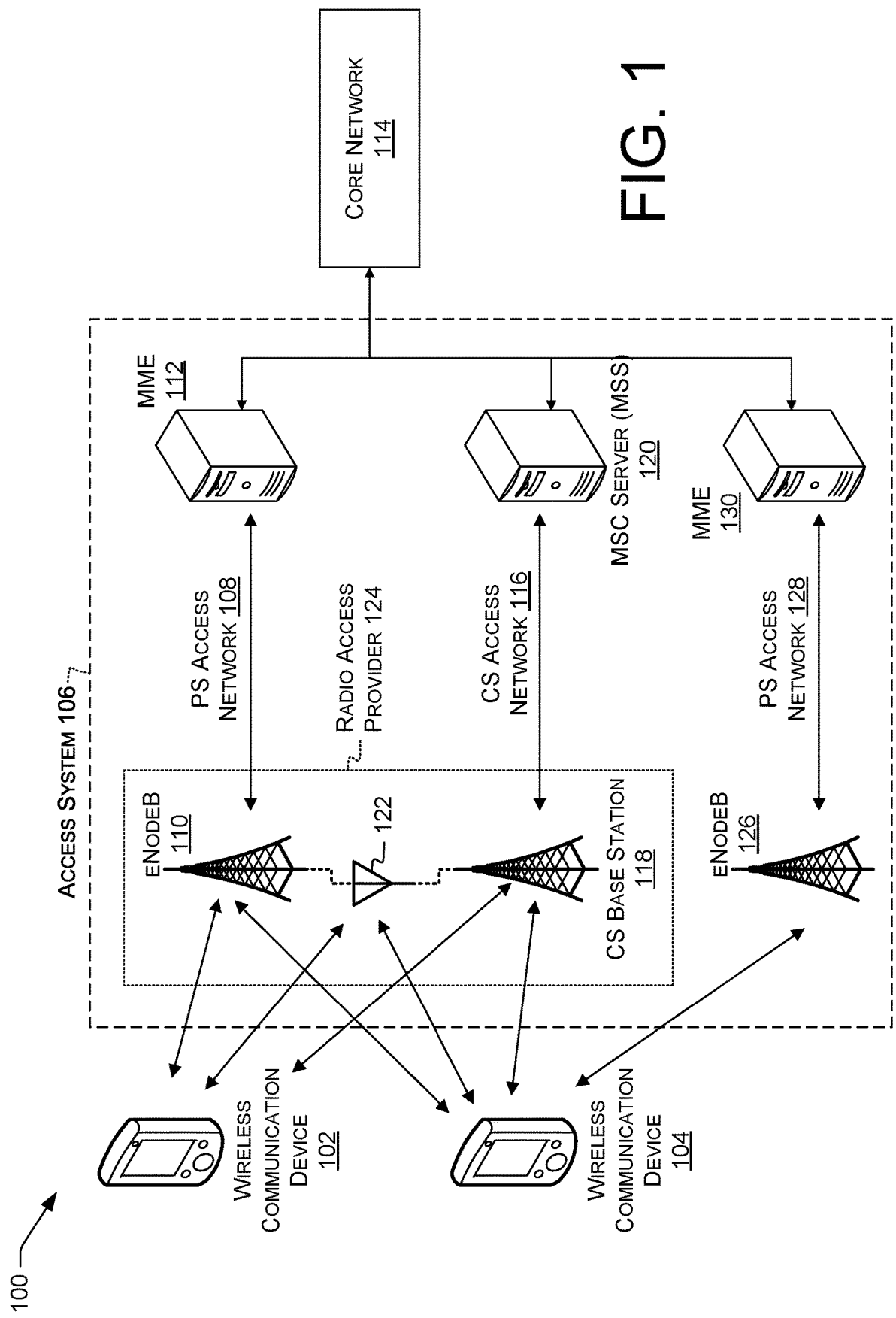
FIG. 1 illustrates an example telecommunications network, including components used to perform data overlay, according to some implementations.

As demand for cellular services increases, cell congestion becomes more common. For example, video streaming over 4G LTE packet data services can consume a significant amount of network bandwidth. Some example systems and techniques described herein permit making effective use of available network bandwidth by permitting network bandwidth to be used for multiple communications simultaneously when those communications have at least some content in common. As used herein, a "terminal" is a communication device, e.g., a cellular telephone or other user equipment (UE), configured to perform, or intercommunicate with systems configured to perform, techniques described herein. Terminals can include, e.g., wireless voice- or data-communication devices. A terminal can include a user interface (e.g., as does a smartphone), but is not required to. For example, an example terminal can be a mobile hotspot such as an access point for an Institute of Electrical and Electronics Engineers (IEEE) 802.11 (WIFI) network using LTE as an upstream connection. Such a terminal may not include a user interface.

Some prior schemes require separate network resource allocations for each terminal in a cell. However, within a cell, data connections to different terminals, e.g., user equipment devices (UEs), may partially overlap in contents. For example, different, unrelated UEs may receive the same downlink bytes for, e.g., HyperText Transfer Protocol (HTTP) headers or firmware updates. Some examples herein detect when the same data bits or octets ("matching data") are being transmitted to two different terminals substantially concurrently. According to some examples, only one copy of the matching data is transmitted, and both terminals receive the matching data. This is referred to herein for brevity as "data overlay." This can reduce network utilization and provide increased network throughput. Some examples determine matching data on an LTE downlink. As used herein, utilization, e.g., as analyzed to determine channel allocations, can include measured utilization, predicted utilization, or any combination or hybrid thereof.

In some examples, accordingly, to save downlink bandwidth, a cell's eNodeB identifies matching data on connections to multiple, different terminals, transmits only one shared copy of the duplicate data, and instructs the relevant terminals to retrieve the data from the shared copy. Data can be shared per LTE Physical Resource Block (PRB) of between about 20 and about 600 payload bits. The terminals can buffer and, if necessary, reorder shared data on receipt. The sharing of data can be performed in ways transparent to applications using the data services.

This disclosure describes, in part, a radio access provider (RAP) configured to identify matching data in two data flows associated with respective, different terminals. The RAP can determine a common wireless-resource allocation associated with the matching data. The RAP can then determine multiple allocation messages associated with respective terminals, each allocation message indicating the common resource allocation, and transmit the allocation messages to the respective terminals via the communications interface.

This disclosure describes, in part, a communication device, e.g., a terminal, configured to receive a first allocation message and a second allocation message via the communications interface. The communication device can determine that the first allocation message is associated with a common resource allocation and that the second allocation message is associated with a terminal-specific resource allocation. The communication device can receive first data associated with the first allocation message and, subsequently, receiving second data associated with the second allocation message. The communication device can then assemble a packet including at least a portion of the second data preceding at least a portion of the first data based at least in part on at least one of the first allocation message, the second allocation message, the first data, or the second data.

This disclosure describes, in part, a communication device, e.g., a terminal, configured to receive an allocation message via the communications interface and determine that the allocation message is associated with a common resource allocation. The communication device can receive, via the communications interface, data associated with the allocation message, and can decrypt the data using a first key associated with the common resource allocation.

The terms "session" or "call" as used herein include a communications path for bidirectional exchange of data between a terminal and at least one other communication device, e.g., a terminal or a server. Example sessions include voice and video calls, e.g., by which human beings converse, a data communication session, e.g., between two electronic systems or between an electronic system and a human being, a Rich Communication Suite (RCS, also known as JOYN) session, or a streaming-media session during which a terminal streams a video or other content item from a server, e.g., communicatively connected with the terminal via the Internet and a carrier network. As used herein, a "party" is a wireless communication device or a user employing a wireless communication device. Sessions can include the transfer of messages between parties.

Example networks carrying sessions include GSM and UMTS networks. Other example networks include LTE networks carrying voice-over-LTE (VoLTE) or other sessions, e.g., using Session Initiation Protocol (SIP) signaling, and data networks, such as WIFI networks carrying voice over Internet Protocol (VoIP) calls or other over-the-top (OTT) sessions encapsulating, e.g., voice or video data in a way transparent to an underlying packet transport. GSM is an example of a circuit-switched (CS) network; LTE and WIFI are examples of packet-switched (PS) networks.

Systems and techniques herein can permit reducing the amount of data to be transmitted over a network, e.g., a wireless downlink such as a cellular downlink. This can reduce network congestion, which can in turn, e.g., increase transfer rates or increase the number of terminals a particular base station can service concurrently.

Illustrative Embodiments

FIG. 1 illustrates an example telecommunications network 100. Terminals 102 and 104, e.g., wireless communication devices, communicate with access system 106 of the telecommunications network. Access system 106 can include a first access network of a first type, e.g., LTE. In this example, PS access network 108 includes an eNodeB 110, e.g., a 4G base station or other access point, that provides connectivity to the PS access network 108. A mobility management entity (MME) 112 of PS access network 108 carries traffic between the PS access network 108 and a core network 114. Core network 114 communicates with access system 106 and provides media-handling services, e.g., to route video or voice data or to maintain continuity of the communication session during handover of a communication session.

In this example, access system 106 includes a second access network of a second, different type, e.g., GSM. In this example, CS access network 116 includes a CS base station (BS) 118 that provides connectivity to the CS access network 116. A mobile switching center (MSC) server (MSS) 120 carries traffic between the CS access network 116 and the core network 114. Each of the first access network and the second access network can be configured to selectively carry a communication session of terminals 102 or 104. For example, voice calls can be carried over the first access network using VoLTE and over the second access network using GSM. Example network types can include at least LTE time-division duplexed, LTE frequency-division duplexed, or GSM.

In some examples, each access network 108 or 116 may include its own radios and antennas. For example, eNodeB 110 and CS BS 118 may include respective, different antennas, or respective, different radios. Moreover, eNodeB 110 and CS BS 118 may operate in respective, different bands or in a common band. In some examples, eNodeB 110 and CS BS 118 may share a common antenna 122. For example, eNodeB 110 and CS BS 118 may be co-located at a single cell site, configured to operate in a common band, and connected to common antenna 122 to communicate with terminal 102 or 104. In some examples using common antenna 122, a common ("twin") tower-mounted amplifier (TMA) can be used for both the first network and the second network, or respective TMAs can be used. The transmit powers of the radios can be adjusted, e.g., to provide selective regions of coverage.

In some examples, a radio access provider 124 (RAP) can include at least eNodeB 110 or CS BS 118. Radio access provider 124 can include common antenna 122 or respective antennas for eNodeB 110 and CS BS 118. For example, radio access provider 124 can be located at a cell site to provide radio access and communication services in a cell area to terminals using two or more different networks. Further details of radio access provider 124 are discussed below with reference to at least FIGS. 3 and 4.

In various implementations, the radio access provider 124 may comprise any one or more base stations, nodeBs, eNodeBs, or wireless access points (e.g., WIFI access points, WIMAX access points, etc.). The radio access provider 124 may include components fixing the radio access provider 124 to a location or positioning the radio access provider 124 at that location, such as components of a cell tower. The radio access provider 124 may also support one or more cells of varying sizes, such as macrocells, microcells, picocells, femtocells, or other small cells, of one or more access networks of a telecommunication network. To provide wireless connectivity to the telecommunication network, the radio access provider 124 may be equipped with any number of components, such as radio antennas, transmitter components, receiver components, power amplifiers, combiners, duplexers, encoder components, decoder components, band pass filters, power sources, or control components, such as allocation module 434 (discussed in greater detail below). The radio access provider 124 may also be or include one or more computing devices, such as a server or server farm, multiple, distributed server farms, a mainframe, a work station, a personal computer (PC), a laptop computer, a tablet computer, an embedded system, or any other sort of device or devices.

In some examples, the radio access provider 300 may transmit and receive over multiple frequency bands. Examples of such frequency bands may include a licensed frequency band, an unlicensed frequency band, a semi-licensed frequency band, an overlapped frequency band, a cellular frequency band, an AWS frequency band, a 700 MHz frequency band (e.g., band 12), an 800 MHz frequency band, a 900 MHz frequency band, a PCS frequency band, an 1800 MHz frequency band, a 1900 MHz frequency band, a 4.9 GHz frequency band, a GSM frequency band, a 2.4 GHz frequency band, a 5.0 GHz frequency band, a 5.8 GHz frequency band, a 3.65 GHz frequency band, a UWB frequency band, a frequency band in a range from 3.1-10.6 GHz, a 3G frequency band, a Wireless Communication Services (WCS) frequency band, a Multichannel Multipoint Distribution Services (MMDS) frequency band, or a WIMAX frequency band.

In the illustrated example, terminal 104 can communicate with a second eNodeB 126 attached via a second PS access network 128 to a second MME 130. For example, as terminal 104 moves, e.g., in a car or carried by a user on foot, terminal 104 may leave the coverage area of eNodeB 110. Terminal 104 may then handover to CS BS 118, which may have a larger coverage area than eNodeB 110 even if the two share a common antenna 122. Upon leaving the coverage area of CS BS 118, terminal 104 may handover to eNodeB 126.

The core network 114 of the telecommunications network may include a number of nodes, omitted for brevity. For example, the core network 114 may be a general packet radio service (GPRS) core network or an evolved packet core (EPC) network, or may include elements from both types of core networks. In some examples in which core network 114 includes an Internet Protocol (IP) Multimedia Subsystem (IMS), such nodes can include a proxy call session control function (P-CSCF), a home location register (HLR)/home subscriber server (HSS), an interrogating call session control function (I-CSCF), a serving call session control function (S-CSCF), an application server (AS), e.g., a telephony AS (TAS), a presence server, or an authorization server such as an equipment identity register (EIR), an enhanced EIR (EEIR), a Domain Name System (DNS) server, or an E.164 Number Mapping (ENUM) server.

The telecommunications network may also include a number of devices or nodes not illustrated in FIG. 1. Such devices or nodes may include an access transfer control function (ATCF), an access transfer gateway (ATGW), a visitor location register (VLR), a serving GPRS support node (SGSN), a gateway GPRS support node (GGSN), a policy control rules function (PCRF) node, a serving gateway (S-GW), a session border controller (SBC), or a media gateway.

The telecommunications network may provide a variety of services to terminal 102, such as synchronous communication routing across a public switched telephone network (PSTN). Further services may include call control, switching, authentication, billing, etc. Furthermore, the devices and networks of FIG. 1 may cooperate to accomplish data overlay, e.g., as described herein.

Figure 2:
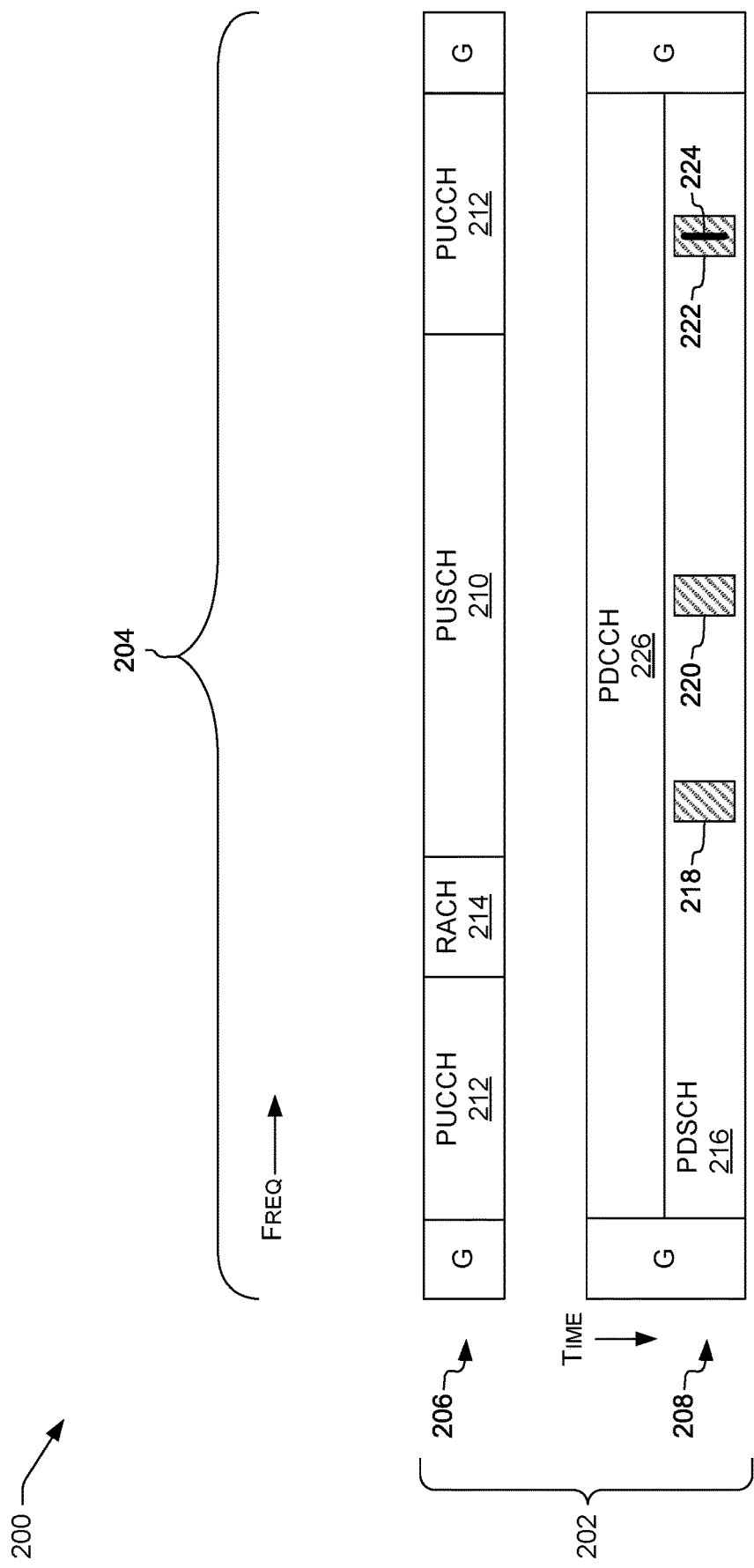
FIG. 2 shows an example band layout supporting overlaying of data, according to some implementations.

FIG. 2 shows an example band layout 200 for operation of a wireless network 202 within a band 204. The illustrated example shows an LTE type network, but other network types can be used.

Illustrated are, for the network 202, LTE uplink plan 206 and LTE downlink plan 208. In the plans, "G" denotes a guard band, which can be used or omitted in various examples. In the illustrated example, plans 206 and 208 are shown as overlapping in frequency within band 204. In some examples, uplink and downlink bands are separate, paired bands. For example, LTE band 12 places uplink between 698 MHz and 716 MHz, and downlink between 728 MHz and 746 MHz. Some examples herein can be used with any combination of single bands (e.g., for LTE TDD) or paired bands (e.g., Band 12 or other LTE FDD bands). As such, nothing in the illustrated configuration limits the width or configuration (single/paired) of bands that can be used with example techniques herein.

In plan 206, the uplink includes a physical uplink shared channel (PUSCH) 210 carrying, e.g., call-setup signaling or user data. Control information can be carried, e.g., via a physical uplink control channel (PUCCH) 212 or a random-access channel (RACH) 214. In the illustrated example, PUCCH 212 includes two portions spaced apart in frequency, referred to herein as sub-bands. In some examples, the sub-bands can include multiple connected or disjoint sections, e.g., one second towards the low-frequency end of band 204 and another section towards the high-frequency end of band 204.

In plan 208, the downlink includes a physical downlink shared channel (PDSCH) 216 that can carry, e.g., user data or call-setup signaling. For example, PDSCH 216 can carry, e.g., data of voice or video sessions, SMS messages, or other PS or CS transmissions, e.g., of user-provided content of a session. PDSCH 216 can include a plurality of windows during which data can be transmitted, illustrated as windows 218, 220, and 222. The specific illustrated locations of windows 218, 220, and 222 are for purposes of explanation and are not limiting.

In the illustrated example, radio access provider 124 can perform frequency hopping, e.g., as specified by the LTE standards. For example, radio access provider 124 can rotate transmissions between windows 218, 220, and 222. This can improve resistance to multipath fading and other frequency-dependent losses, improving signal-to-noise ratio (SNR) or capacity.

In some examples, the windows 218, 220, or 222 can include (or correspond to, be represented by, or be defined by, and likewise throughout) respective carriers or subcarriers. For example, in an LTE network, subcarriers are spaced 15 kHz apart. In the illustrated example, window 222 includes, e.g., a first subcarrier frequency 224±7.5 kHz.

In this example, an allocation module 434, discussed below with reference to FIG. 4, can assign LTE physical resource blocks (PRBs) corresponding to windows 218 and 220 to LTE transmissions from radio access provider 124, e.g., an LTE eNodeB 110 or 126. For example, the windows 218, 220, or 222 can include respective physical resource blocks (PRBs), each PRB including twelve adjacent subchannels, virtual resource blocks (VRBs), or resource-block groups (RGs).

In the illustrated example, a physical download control channel (PDCCH) 226 carries Downlink Control Information (DCI) messages. A DCI message identifies a window in the PDSCH 216 and directs at least one terminal to process data contained in the identified window. This permits each terminal to receive the data intended for that particular terminal.

In the illustrated example, the PDCCH 226 occupies the same band as the PDSCH 216, and the function of that band changes over time. For example, PDCCH 226 data such as DCI messages can be transmitted, and then PDSCH 216 data can be transmitted. This permits terminals to prepare to receive PDSCH 216 data based on the DCI messages before the PDSCH 216 data arrives.

In some examples, radio access provider 124 can transmit reference signals (omitted for brevity) within plan 208. Measuring the reference symbols can permit detecting interference or otherwise determining the condition of a link.

In some examples, radio access provider 124 can adjust channel allocations based on utilization. For example, radio access provider 124 can adjust allocations to balance load, to satisfy quality-of-service (QoS) guarantees, or to avoid windows that are experiencing interference or unfavorable propagation characteristics (e.g., changes in fast fading as a terminal moves with respect to an antenna 122).

Figure 3:
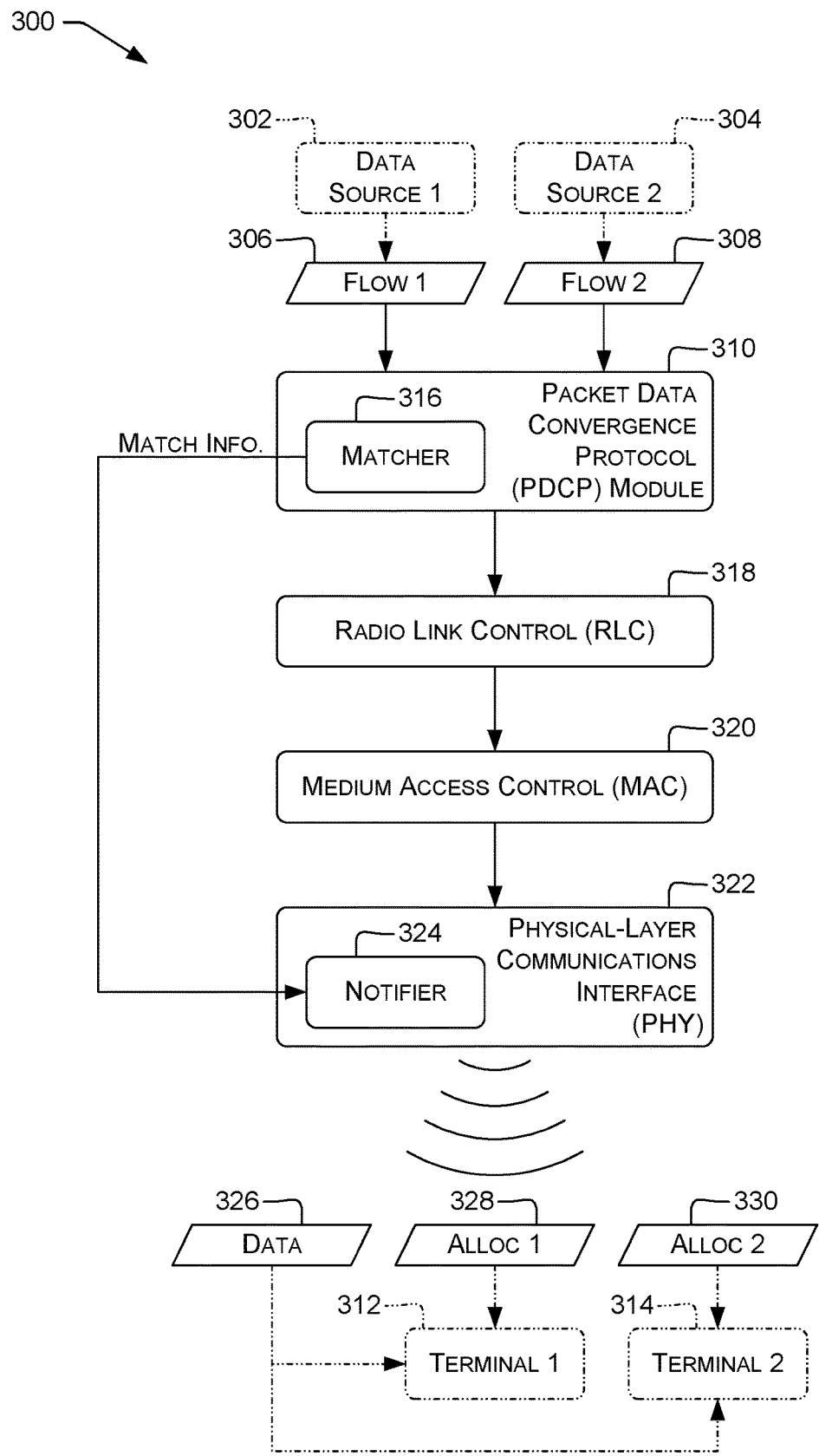
FIG. 3 illustrates an overview of a radio access provider configured to overlay data transmissions to wireless communication devices.

FIG. 3 illustrates a dataflow diagram of a radio access provider 300, which can represent radio access provider 124 or 404, and related components and data items. For example, radio access provider 300 can be, include, or be embodied in a base station for a wireless communications network, e.g., a cellular network. Radio access provider 300 can be configured to perform operations described herein, e.g., with reference to FIGS. 3-12. For example, radio access provider 300 can be configured to select, for at least one terminal, data transmission windows, e.g., blocks, sub-bands, timeslices, or other assignable units, from one or more frequency bands. As used herein, the term "window" is not restricted to the usage of the word "window" in any particular network specification.

In the illustrated nonlimiting example, two data sources 302, 304 provide respective data flows 306, 308 to a Packet Data Convergence Protocol (PDCP) module 310. In some examples, the data sources 302, 304 can represent servers, back-end services, cloud servers, other terminals, personal computers, or other providers of the data flows 306, 308, e.g., Web servers, audio or video streaming servers, or update servers distributing, e.g., firmware, operating-system, or application updates. For example, a data flow 306, 308 can include a stream of data, e.g., for a real-time or recorded voice or video session, individual packet(s) or other collections of data, e.g., for pings, or sequences of packets, e.g., for Hypertext Transfer Protocol (HTTP) request/response exchanges. A data flow 306, 308 can include connection-oriented or connectionless transmissions, e.g., Transmission Control Protocol (TCP) or User Datagram Protocol (UDP) transmissions.

In some examples, the respective data flows 306, 308 are associated with respective, different terminals. In the illustrated example, data flow 306 is associated with a terminal 312 and data flow 308 is associated with a terminal 314. For example, each data flow 306, 308 can include unicast data addressed to the respective terminal 312, 314, or can include multicast or broadcast data to which the respective terminal 312, 314 is subscribed. In some examples, data flow 306 is not addressed to terminal 314, or data flow 308 is not addressed to terminal 312.

In the illustrated example, PDCP module 310 includes a matcher 316. Matcher 316 can execute one or more comparison algorithms or otherwise identify matching data in the data flows 306, 308. For example, matcher 316 can use at least one of a Knuth-Morris-Pratt (KMP), Boyer-Moore, Rabin-Karp, or other string-searching algorithm; a Smith-Waterman or other sequence-alignment algorithm; a hashing or locality-sensitive hashing algorithm; a fingerprinting algorithm; or a literal or regular-expression matching algorithm. Matcher 316 can compare hashes, fingerprints, or other outputs of any of those algorithms to identify the matching data. For example, multiple users of the stock browser on respective ANDROID smartphones may have the same User-Agent string in HTTP requests, e.g., "User-Agent: Mozilla/5.0 (Linux; Android 5.1) AppleWebKit/537.36 (KHTML, like Gecko) Chrome/50.0 Mobile Safari/537.36". This string is 116 characters long and may be transmitted as 116 octets for each user, for each HTTP request. Matcher 316 can determine that two HTTP requests originating from different terminals have the same User-Agent string.

In another example, two HTTP responses may have the same HTTP content-type strings, e.g., "Content-Type: application/xhtml+xml". This string is 35 octets. Matcher 316 can determine that data flows 306 and 308 both include this content-type string or other matching data. As described below, a single copy of the content-type string can be transmitted, reducing downlink utilization by 35 octets, in this example.

PDCP module 310 can provide packets via a radio-link control (RLC) module 318 and a medium access control (MAC) module 320 to a physical-layer transceiver (PHY) 322, which can be an example of a communications interface. RLC 318, MAC 320, and 322 can perform functions described in the relevant network standards, e.g., the LTE ETSI TS 133 xxx- and 136 xxx-series standards, in addition to functions described herein or except as described herein. PHY 322, in an example of LTE, can include a notifier 324. Notifier 324 can receive information ("Match Info.") from matcher 316 regarding matching data 326 in the data flows 306 and 308. Notifier 324 can then determine at least one allocation message indicating that terminals 312, 314 should receive data during specific allocated portion(s) of a band, e.g., specific time windows or frequency sub-bands. For example, allocation messages 328, 330 can include respective LTE DCI messages. In the illustrated example, notifier 324 determines allocation message 328 for terminal 312 and allocation message 330 for terminal 314. PHY 322 can transmit allocation messages 328, 330 via a wired or (as depicted) wireless network link.

Throughout this discussion, matching data 326 includes at least one range of one or more contiguous octets, or of whatever the smallest addressable unit of data on a particular network may be. For example, on a network configured to transmit no fewer than 32 bits (a "DWORD") at a time, matching data 326 can include at least one range of one or more contiguous DWORDs. In some examples, matching data 326 can include at least one range of N or more contiguous octets (or other units), for positive integer N. In some examples, N can be selected so that any increase in network usage due to transmitting allocation messages indicating the matching data 326 is outweighed by the reduction in data transferred. In some examples, matching data 326 can include multiple ranges, e.g., a range for octets 5-8, a range for octets 13-21, and a range for octet 42.

In the illustrated example, allocation messages 328, 330 indicate a common resource application associated with the matching data 326 determined by matcher 316. PHY 322 also transmits to terminals 312, 314 the matching data 326 associated with the allocation messages 328, 330. In this example, the terminals 312, 314 receive the matching data 326 in the same window. That window is determined by the radio access provider 300 and transmitted to terminals 312, 314 in the respective allocation messages 328, 330.

FIG. 3 shows an example of an LTE radio access provider 300. However, this example is not limiting. Other protocol stacks can be used than the illustrated stack of PDCP 310, RLC 318, MAC 320, and PHY 322. Matcher 316 and notifier 324 can be located at any level of the protocol stack, as long as matcher 316 is configured to locate matching data 326 in multiple data flows and notifier 324 is configured to indicate to multiple terminals the window in which a single copy of matching data 326 is to be transmitted, in some examples.

Figure 4:
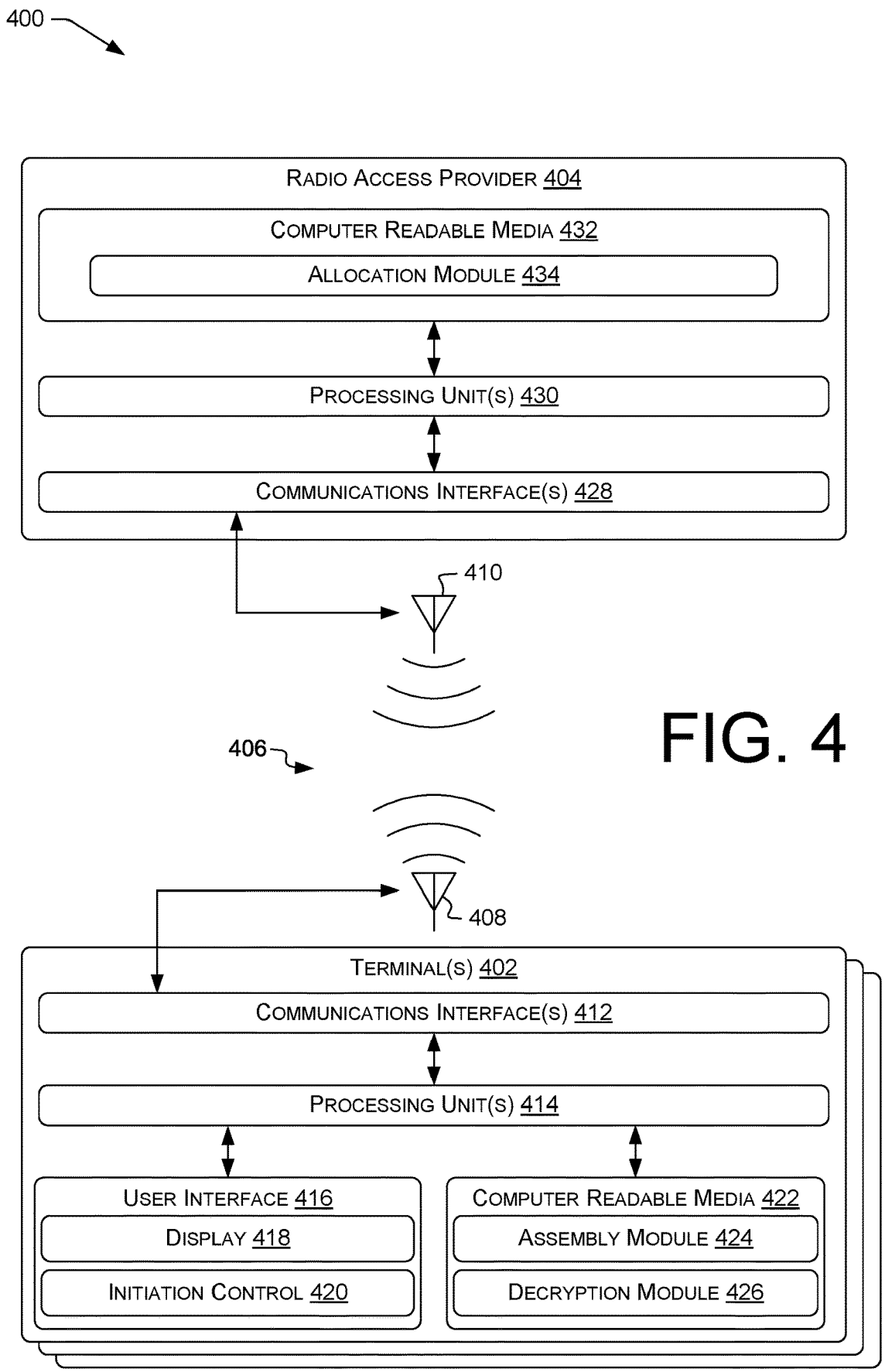
FIG. 4 is a block diagram illustrating a system for implementing data overlay according to some implementations.

FIG. 4 is a block diagram illustrating a system 400 permitting data overlay according to some implementations. The system 400 includes terminal(s), individually or collectively referred to herein with reference 402, e.g., wireless phone(s) or other wireless communication devices or wireless-capable computing devices. Terminal 402 can represent terminals 102, 104, 312, or 314. Terminal 402 is coupled to a radio access provider 404 via wireless connection 406. Wireless connection 406 can be accessed, e.g., via one or more antennas 408 of terminal(s) 402 and one or more antennas 410 of radio access provider 404. The radio access provider 404 can represent radio access provider 124 or 300, or an individual eNodeB 110 or 126 or CS BS 118, FIG. 1.

The wireless connection 406 can include a downlink channel via which a particular transmission can be received substantially concurrently by multiple terminals 402. In the example of FIG. 2, transmissions on the PDSCH 216 can be received by multiple terminals 402, even if a particular transmission is sent only once. In some examples, the RAP 404 is configured to transmit matching data 326 via the wireless connection 406 so that a particular transmission of the matching data 326 can be received by multiple terminals 402. For example, a cellular base station using beam steering to direct transmissions to particular terminals 402 during normal operation can be configured to disable beam steering while transmitting matching data 326, or to steer multiple beams to respective terminal(s) 402 or groups thereof so that the matching data 326 can be received by multiple terminals 402.

Data overlay as described herein can be performed, e.g., for 2G, 3G, 4G, WIFI, or other networks. Communications between the radio access provider 404 and computing devices such as the terminal 402 can be performed via wide-area wireless connections 406 using a technology such as GSM, GSM Enhanced Data GSM Environment (EDGE) Radio Access Network (GERAN), UMTS Terrestrial Radio Access Network (UTRAN), Code Division Multiple Access (CDMA), UMTS, LTE, or the like. Example networks include Time Division Multiple Access (TDMA), Evolution-Data Optimized (EVDO), Advanced LTE (LTE+), Generic Access Network (GAN), Unlicensed Mobile Access (UMA), Orthogonal Frequency Division Multiple Access (OFDMA), General Packet Radio Service (GPRS), EDGE, Advanced Mobile Phone System (AMPS), High Speed Packet Access (HSPA), evolved HSPA (HSPA+), VoIP, VoLTE, IEEE 802.1x protocols, WIMAX, WIFI, and/or any future IP-based network technology or evolution of an existing IP-based network technology. Communications between the radio access provider 404 and computing devices such as the terminal 402 are not necessarily limited to wireless connection 406 and can additionally or alternatively be performed using other technologies, such as wired (Plain Old Telephone Service, POTS, or public switched telephone network, PSTN, lines), optical (e.g., Synchronous Optical NETwork, SONET) technologies, and the like. In some examples, multiple terminals 402 can be concurrently connected with radio access provider 404 via wireless connection(s) 406. In some of these examples, each of the multiple terminals 402 can be connected via a respective access networks, e.g., networks 108, 116, FIG. 1. In some examples, terminals 402 are connected via at least one access network that is not a 2G access network, is not a 3G access network, is not a CDMA access network, or is not an access network of any combination of those types.

In some examples, the radio access provider 404 includes or is communicatively connected with an interworking function (IWF) or other device bridging networks, e.g., LTE, third-generation cellular (3G), and POTS networks. In some examples, the radio access provider 404 can bridge Signaling System #7 (SS7) traffic from the PSTN into the wireless connection 406, e.g., permitting PSTN customers to place calls to cellular customers and vice versa.

A terminal 402 can be or include a wireless phone (e.g., a smartphone), a wired phone, a tablet computer, a laptop computer, a wristwatch, a portable digital assistant (PDA), a wearable computer (e.g., electronic/smart glasses, a smart watch, fitness trackers, etc.), a networked digital camera, or another type of computing device. The terminal 402 can be configured to be generally mobile, e.g., a smartphone, or generally stationary, e.g., a television, desktop computer, game console, set top box, or the like. The terminal 402 can include one or more communications interface(s) 412 configured to selectively communicate wirelessly via the wireless connection 406, e.g., via access system 106. Communications interface(s) 412 of terminal(s) 402 can be communicatively connectable with a base station, e.g., eNodeB 110 or 126, CS BS 118, or RAP 124. The terminal 402 can further include one or more processing unit(s) 414 communicatively coupled to the communications interface(s) 412. The processing unit(s) 414 can be or include, e.g., one or more microprocessors, microcontrollers, field-programmable gate arrays (FPGAs), application-specific integrated circuits (ASICs), programmable logic devices (PLDs), programmable logic arrays (PLAs), programmable array logic devices (PALs), or digital signal processing units (DSPs). The terminal 402 can further include a user interface (UI) 416, e.g., including an electronic display device 418, a speaker, a vibration unit, a touchscreen, or other devices for presenting information to a user and receiving commands from the user. The user interface 416 can include a session-initiating user interface control 420, e.g., a touchscreen button, to indicate a communication session should be initiated. For example, the control 420 can include a "Call" button to initiate a voice call session, or a "Play" button to initiate a media-streaming session. The user interface 416 or components thereof, e.g., the display 418, can be separate from the terminal 402 or integrated (e.g., as illustrated in FIG. 1) with the terminal 402.

The terminal 402 can further include one or more computer-readable media 422 communicatively coupled to the processing unit(s) 414. The computer-readable media 422 can be used to store data and to store instructions that are executable by the processing units 414 to perform various functions as described herein. The computer-readable media 422 can store various types of instructions and data, such as an operating system, device drivers, etc. The processing-unit-executable instructions can be executed by the processing units 414 to perform the various functions described herein.

The computer-readable media 422 can be or include computer-readable storage media. Computer-readable storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, solid-state disk devices, or any other tangible, non-transitory medium which can be used to store the desired information and which can be accessed by the processing units 414. Tangible computer-readable media can include volatile and nonvolatile, removable and non-removable media implemented in any method or technology for storage of information, such as computer readable instructions, data structures, program modules, or other data.

The computer-readable media 422 can include processing-unit-executable instructions of a client application (omitted for brevity). The client application, e.g., a native or other dialer, can permit a user to originate and terminate communication sessions associated with the terminal 402, e.g., a wireless phone. The client application can additionally or alternatively include a short message service (SMS), RCS, or presence client, a client of another telephony service offered by the radio access provider 404 or the core network 114, or a client of data services, e.g., a smartphone app for streaming-media playback.

The computer-readable media 422 can include processing-unit-executable instructions of an assembly module 424 configured to assemble packets based on data received via wireless connection 406. Example functions of assembly module 424 are discussed herein with reference to FIGS. 8, 9, and 12.

The computer-readable media 422 can include processing-unit-executable instructions of a decryption module 426 configured to decrypt data received via wireless connection 406. Example functions of decryption module 426 are discussed herein with reference to FIGS. 10-12.

In some examples, radio access provider 404 can communicate with terminal 402 or other devices via one or more communications interface(s) 428, e.g., network transceivers for wired or wireless networks (e.g., wireless connection 406), or memory interfaces. The radio access provider 404 can include one or more processing units 430 communicatively coupled to the communications interface(s) 428. Processing units 430 can be of any of the types described herein with reference to processing units 414.

The radio access provider 404 can include one or more computer-readable media 432 communicatively coupled to the processing units 430. Computer-readable media 432 can be of any of the types described herein with reference to computer-readable media 422. The computer-readable media 432 can store processing-unit-executable instructions of an allocation module 434, e.g., an LTE scheduler. Allocation module 434 can perform functions described herein with reference to FIG. 3, e.g. functions of matcher 316, notifier 324, or PHY 322. The allocation module 434 can additionally or alternatively perform functions of a "baseband," e.g., a GSM baseband or modem function. The allocation module 434 can be an example of an allocator of network resources. The processing-unit-executable instructions can be executed by the processing units 430 to perform various functions described herein. Other modules can be present in computer-readable media 432. The use of the terms "allocator," "scheduler," or "baseband" does not require that any functions be performed that are not described herein. For example, a baseband can include allocation functions but not coding functions.

In some examples, allocation module 434 or other components of RAP 404 can be configured to transmit or receive control or media information of a first network, e.g., PS access network 108. For example, RAP 404 can be configured to encode or modulate transmitted data, or demodulate or decode received data. Allocation module 434 can operate or cooperate with communications interface(s) 428 to perform these functions. In an example, allocation module 434 can include or be included in an LTE engine configured to bridge communications between terminal 402 and an IP-based packet data network such as core network 114, FIG. 1.

In some examples, allocation module 434 can be configured to allocate, assign, or otherwise select channels, frequency sub-bands, or other radio-frequency (RF) resources to transmissions of the first network, e.g., network 108, FIG. 1. Allocation module 434 can divide the RF resources by time (e.g., time-division duplexing, TDD or time-division multiplexing, TDM), frequency (e.g., frequency-division duplexing, FDD or frequency-division multiplexing, FDM), or a combination thereof (e.g., LTE FDD, which performs FDD within consecutive timeslots, or GSM allocation, which allocates timeslots on individual carriers). Examples of the operation of allocation module 434 are discussed below, e.g., with reference to FIGS. 3-12.

Allocation module 434 can allocate access to sub-bands of a frequency band. For brevity, references to "bands" herein may include sub-bands. Each frequency band may include multiple resource blocks (alternatively referred to herein as "blocks" or "RBs") or channels which may be assigned by the allocation module 434 to terminals 402 for downlink communications, uplink communications, or both. In some examples, a frequency sub-band can be divided into RBs in both the time and frequency dimensions. Allocation module 434 can select windows, e.g., blocks or subcarriers, based at least in part on, e.g., based on any or all of service priorities, signal quality metrics, power capacities, available unlicensed channels, or cross-correlations.

In some examples, an RB is an LTE physical resource block (PRB), e.g., 12 subcarriers wide and one slot (0.5 ms; 7 OFDMA symbols) in duration. LTE PRBs are arranged into subframes, pairs of consecutive slots, and frames, sequences of 10 consecutive subframes. In some examples, an RB is a GSM subcarrier, frame, or timeslot. GSM subcarriers are spaced 400 kHz apart, and each timeslot has a duration of 0.5765 ms. A frame of eight timeslots has a duration of 4.615 ms. One timeslot per frame provides at least 9.6 kbit/s of data, sufficient for a voice call.

In various implementations, allocation module 434 can select windows for communications with terminals 402 based at least in part on, e.g., service priorities such as quality of service (QoS) values, signal quality metrics, transmission capacities of available bands, or other factors. The allocation module 434 may repeat selecting windows, e.g., blocks or channels, at each LTE transmission time interval (TTI) or other timeslice, and may select blocks or channels for both uplink and downlink communications. The allocation module 434 may coordinate selection with other radio access providers 300 within radio range to reduce contention or interference between radio access providers 300. The allocation module 434 may select blocks or channels, e.g., using a round-robin scheduling algorithm, or using scheduling algorithm(s) that give priority to particular terminal(s) 402, e.g., based on signal quality metrics, transmission capacities, available UE power, or available channels meeting selected criteria. For example, higher priority may be given to terminals 402 with the highest signal quality metrics, since those users are likely to be near towers and expect effective, high-speed service, and also to terminals 402 with the lowest signal quality metrics, since those users are likely to be near the edge of cell coverage and need additional channels to maintain communications.

When selecting blocks or channels for a terminal 402, the allocation module 434 may utilize a cost-function which takes into account the available, unassigned blocks or channels, frequency sub-bands available to terminal 402, as well as coding and modulation, transmission modes, transmission scenarios (e.g., multiband multiplexing, frequency diversity, frequency hopping, band hopping and a variety of combinations of these and other transmission scenarios), cross-correlation scores, and any guaranteed bit rate, quality-of-service (QoS), delay, or jitter requirements for the active application or user of the terminal 402. Utilizing this information, the allocation module 434 may select blocks or channels from a single frequency band (or sub-band, and likewise throughout this paragraph) or from multiple frequency bands. If multiple frequency bands, the multiple frequency bands may include frequency bands with high path loss and low path loss or both licensed and unlicensed frequency bands. In some examples, allocation module 434 can use a gradient-descent algorithm to determine frequency assignments that mathematically minimize the cost function for some or all terminals 402 connected to radio access provider 300.

Figure 5:
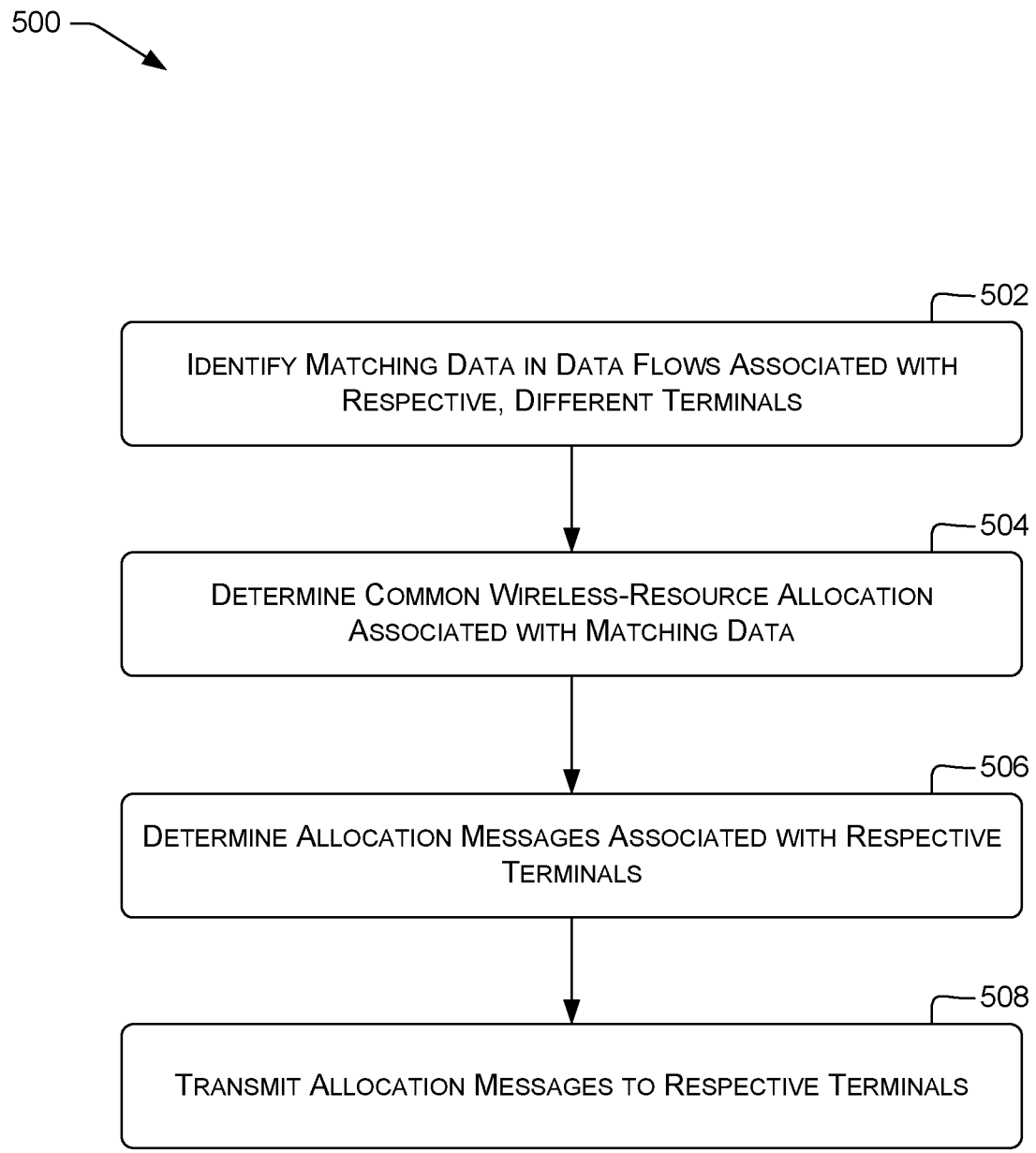
FIG. 5 illustrates an example process for overlaying data according to some implementations.

FIG. 5 illustrates an example process 500 for overlaying data. Process 500, and likewise processes shown in FIGS. 6-12, can be performed, e.g., by a radio access provider, e.g., radio access provider 124, 300, or 404, communicatively connectable with terminals, e.g., terminal 402, of a telecommunications network 100. In some examples, the radio access provider 404 includes one or more processing units (e.g., processing unit 430) configured to perform operations described below, e.g., in response to computer program instructions of the allocation module 434.

Operations shown in FIGS. 5-12, discussed below, can be performed in any order except when otherwise specified, or when data from an earlier step is used in a later step. For clarity of explanation, reference is herein made to various components shown in FIGS. 1, 3, and 4 that can carry out or participate in the steps of the exemplary method, and to various channels, bands, and plans shown in FIG. 2. It should be noted, however, that other components can be used; that is, exemplary method(s) shown in FIGS. 5-12 are not limited to being carried out by the identified components, and are not limited to using the identified channels, bands, plans, or network types.

In some examples, the operations of process 500 and other processes herein can be performed prior to encryption of application-layer data. Application-layer data can include data provided to an Open Systems Interconnection (OSI) Model layer 7 protocol or other comparable-level protocol, e.g., HTTP or Real-time Transport Protocol (RTP). For example, the operations of process 500 and other processes herein can be performed by a Packet Data Convergence Protocol (PDCP) subsystem of an LTE network before the LTE encryption normally performed by the PDCP subsystem. Performing operations before encryption can permit locating a higher volume of matching data, since the entropy of encrypted data is often close to uniform and therefore matches between any two sequences of contiguous bytes are less likely than for data before encryption.

In some examples, at block 502, the allocation module 434 (or other components of RAP 404, and likewise throughout the remainder of this document) can identify matching data 326 in two data flows associated with respective, different terminals 402, e.g., data flows 306, 308. In some examples, the allocation module 434 can identify the matching data in more than two data flows. The allocation module 434 can use any of the algorithms discussed above with reference to matcher 316 to locate the matching data 326. For example, the allocation module 434 can locate a substring, e.g., the longest substring, common to predetermined subsets of each of the data flows. In some examples, the data flows can include non-guaranteed-bit-rate (non-GBR) data flows, e.g., HTTP transactions (as opposed to telephone calls or other GBR data flows).

In some examples, at block 504, the allocation module 434 can determine a common wireless-resource allocation associated with the matching data 326. For example, the allocation module 434 can select PRBs or other allocations, e.g., windows in time or frequency, to be used to transmit the matching data 326. Examples are discussed above, e.g., with reference to FIGS. 2-4.

In some examples, at block 506, the allocation module 434 can determine multiple allocation messages associated with respective terminals 402. For example, the allocation messages can include respective LTE DCI messages. Examples are discussed above, e.g., with reference to notifier 324, FIG. 3. In some examples, the allocation module 434 can determine at least one allocation module for each of the respective terminals 402. Each allocation message can indicate the common resource allocation, e.g., by including a starting PRB number and PRB count, or other identification of the common resource allocation. In some examples, the allocation message can include an indication symbol indicating that the allocation message refers to a common resource allocation. In some examples, an individual allocation message can indicate both a common resource allocation and a separate, terminal-specific resource allocation. Such allocation messages are considered herein to be associated both with the common resource allocation and with the separate, terminal-specific resource allocation.

In some examples, the allocation module 434 can determine multiple allocation messages, only some of which indicate the common resource allocation. In some examples, two data flows share the matching data 326 and a third does not. The allocation module 434 can determine two allocation messages indicating the common resource allocation and a third allocation message indicating allocation(s) specific to the data flow that does not share the matching data 326.

In some examples, at block 508, the RAP 404 can transmit the allocation messages to the respective terminals 402, e.g., via the communications interface(s) 428. Block 508 can additionally include receiving acknowledgement messages or other indications that the allocation messages were received, but that is not required. Any two of the allocation messages can be transmitted concurrently or spaced apart in time. Any two of the allocation messages can be transmitted in a common frequency range, or in respective, spaced-apart frequency ranges. Examples are discussed above, e.g., with reference to notifier 324, FIG. 3. In some examples, block 508 can include transmitting the allocation messages to respective next-hop network devices via which the allocation messages can be forwarded towards the respective terminals 402.

Figure 6:
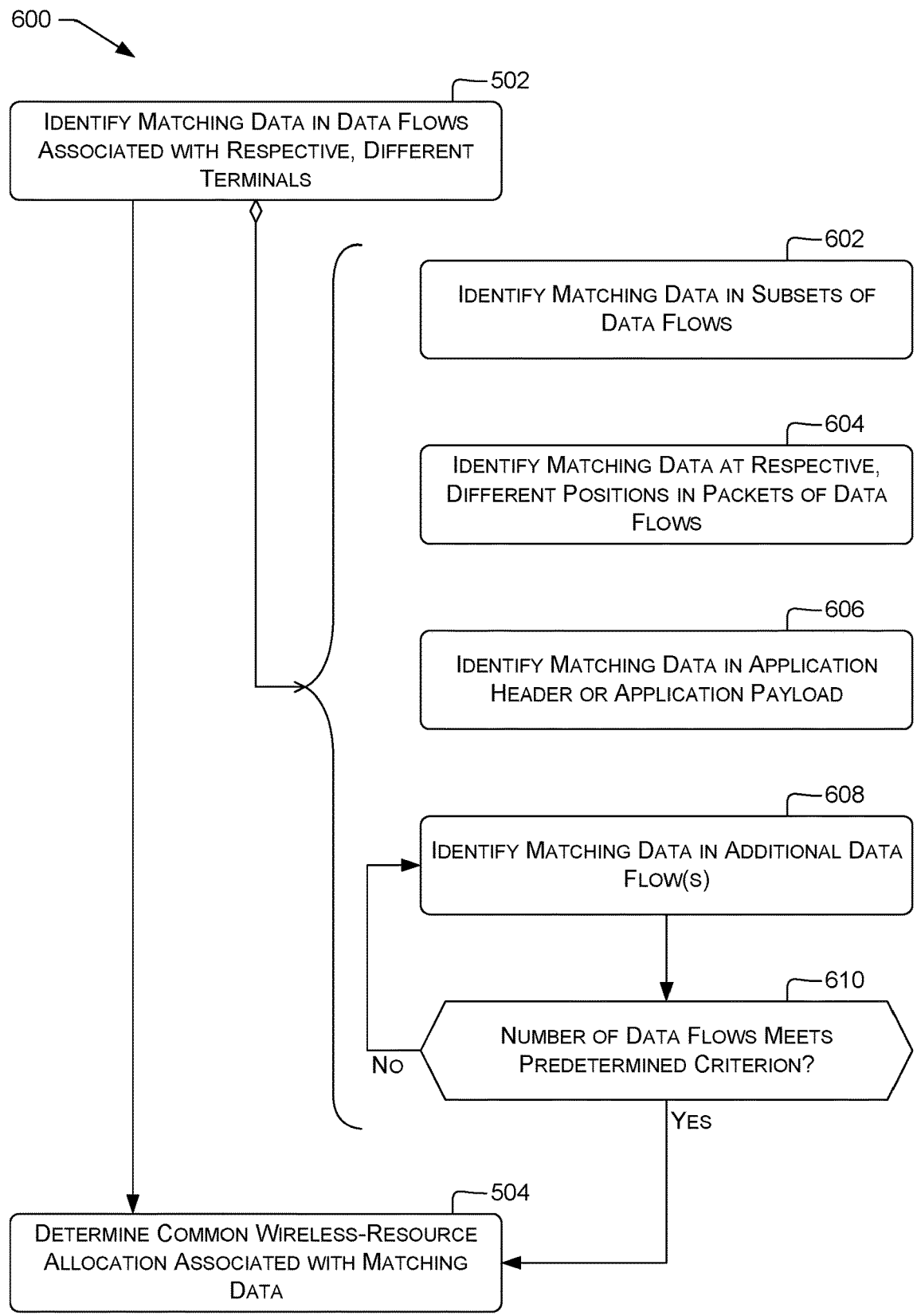
FIG. 6 illustrates an example process for identifying matching data, according to some implementations.

FIG. 6 illustrates an example process 600 for overlaying data performed, e.g., by the radio access provider 124, 300, or 404. Block 502 can include block 602, block 604, block 606, or blocks 608 and 610.

In some examples, at block 602, the allocation module 434 can identify the matching data in respective subsets of the two data flows. The respective subsets can be associated with a same transmission window, e.g., in time or band. For example, the respective subset for a data flow can be the data to be transmitted for that data flow during a particular TTI or other transmission window. Identifying matching data 326 within a window, e.g., a TTI, can reduce transmission latency by reducing the extent to which data may be transmitted out of order (as discussed herein with reference to assembly module 424 and FIGS. 8, 9, and 12). Moreover, identifying matching data 326 within a window may reduce the amount of data from the data flows to be searched and thus reduce the computational cost of identifying the matching data 326.

In some examples, at block 604, the allocation module 434 can identify the matching data at different locations in respective packets of the data flows. For example, each data flow can include packets associated with respective windows, e.g., one packet per TTI. The two data flows can include a first data flow and a second data flow. Block 604 can include locating the matching data 326 at a first position in a first packet associated with the first data flow and at a second, different position in a second packet associated with the second data flow. This can permit locating matches even among, e.g., unrelated data flows. For example, two HTTP data flows may both include "Content-Type: text/html" headers, but at different locations within a response (e.g., the first header in one and the last header in another). Using block 604 can permit locating that Content-Type header as matching data 326 regardless of location, and thereby of reducing the amount of data to be transmitted in more situations than situations in which matching data 326 lines up precisely in two data flows. In an example of video streaming, a macroblock representing a black screen, e.g., after a fadeout, may be represented by the same bytes in two unrelated video streams. Using block 604 can permit determining matching data 326 in those two macroblocks even when the black screens occur at different times.

In some examples, at block 606, the allocation module 434 can identify the matching data in at least one of an application header or an application payload of a data stream of at least one of the data flows. For example, the application header can include a header for an OSI Model layer 7 protocol or other comparable-level protocol, e.g., HTTP, File Transfer Protocol (FTP), or RTP. The application payload can include a payload of such a stream. Application headers and application payloads, in some examples, can exclude lower-level data also transmitted for framing or identification purposes, e.g., IP addresses. Using block 606 can permit identifying matching data at a level less likely to be affected by lower-level encoding schemes, e.g., used for transmission over links that are not eight-bit clean. Using block 606 can also permit implementing functions of the matcher 316 at a higher level in the network stack than might otherwise be the case, which can permit locating matching functions on computing resources with relatively higher capacity. Some examples do not use block 606 and may identify matching data 326 at other layers than the application layer, or at any layer, which can increase the total amount of data overlaid by providing more data available for matching.

In some examples, at block 608, the allocation module 434 can identify the matching data in at least one additional data flow, e.g., at least one data flow in addition to the first and second data flows discussed above with reference to block 502. Examples are discussed herein, e.g., with reference to matcher 316 and block 502. Block 608 can be followed by decision block 610.

In some examples, at decision block 610, the allocation module 434 can determine whether a number of data flows in the at least one additional data flow meets a predetermined criterion. Using blocks 608 and 610 can permit determining matching data only if a certain number of data flows share the matching data, which can permit balancing data savings due to overlay with any overhead of allocation messages. For example if data overlay should be used only when three data flows share the matching data 326, the predetermined criterion tested in decision block 610 can be, e.g., that the number of additional data flows is at least one, or that the number of total data flows having matching data 326 is at least three. If the number of data flows does meet the predetermined criterion, decision block 610 can be followed by block 504. If not, decision block 610 can be followed by block 608 to attempt to locate matching data 326 in more data flows. Alternatively, if the number of data flows does meet the predetermined criterion, decision block 610 can be followed by logic (omitted for brevity) to transmit the data in a non-overlaid manner.

Figure 7:
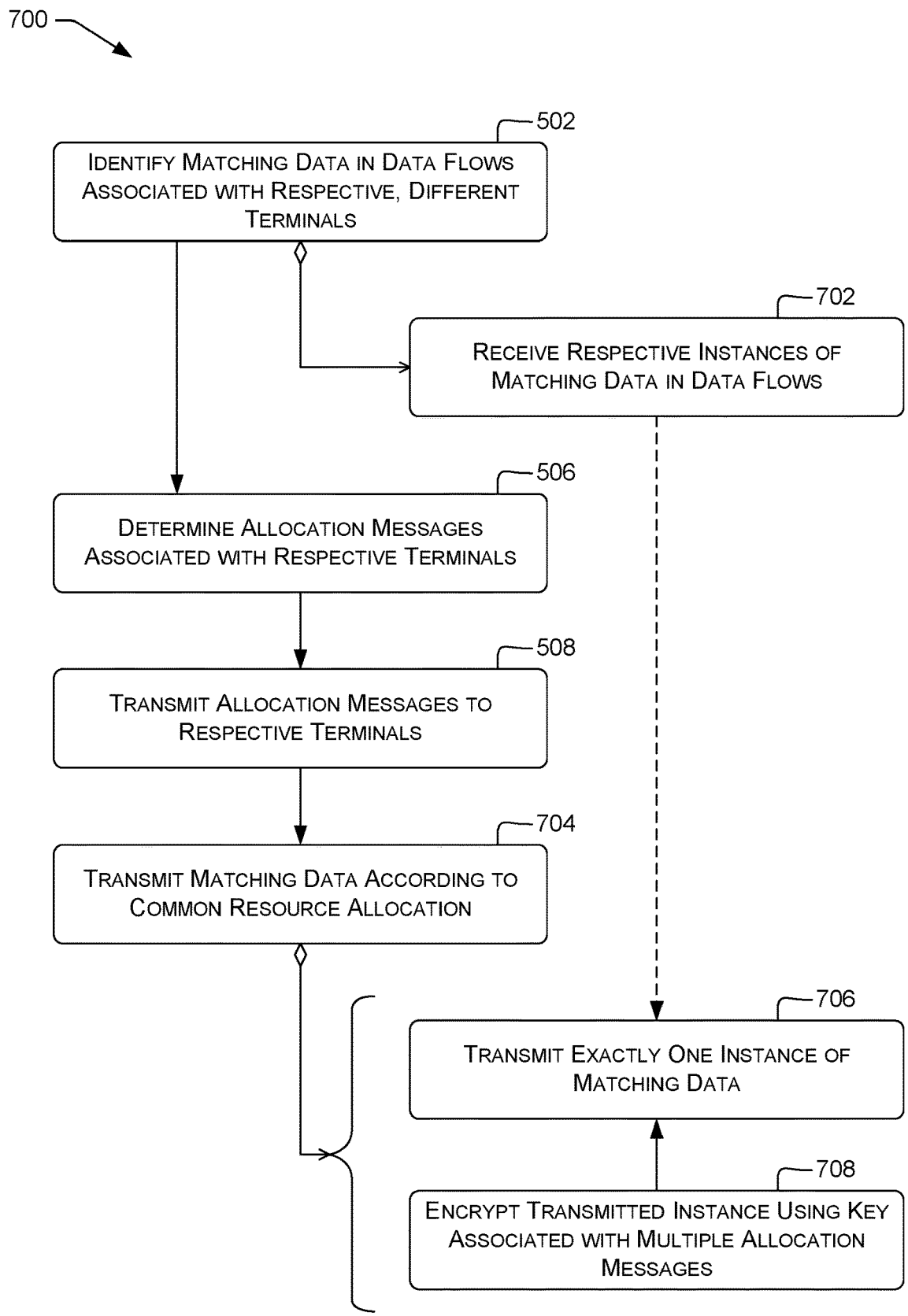
FIG. 7 illustrates an example process for preparing and transmitting overlaid data, according to some implementations.

FIG. 7 illustrates an example process 700 for overlaying data performed, e.g., by the radio access provider 124, 300, or 404. Block 502 can include block 702. Block 508 can be followed by block 704.

In some examples, at block 702, the RAP 404 can receive respective instances of the matching data 326 in respective data flows. For example, the RAP 404 can receive a first instance, e.g., a first copy, of the matching data 326 in a first data flow 306 of the two data flows. The RAP 404 can additionally receive a second instance of the matching data 326 in a second data flow 308 of the two data flows. Further processing is discussed below with reference to block 706.

In some examples, at block 704, the RAP 404 can transmit the matching data 326 via the communications interface 428 according to the common resource allocation. For example, the RAP 404 can transmit the matching data 326 in PRBs or other windows identified by the allocation module 434. Block 704 can include block 706 or block 708, in some examples.

In some examples, at block 706, the RAP 404 can transmit exactly one transmitted instance of the matching data 326 via the communications interface 428. As indicated by the dashed line, block 706 can be used in some examples that also use block 702. Receiving multiple instances of the matching data 326 but transmitting only one instance can reduce bandwidth usage and network congestion over wireless connection 406. Note that block 706 does not preclude retransmission in the event that one or more terminals 402 requests retransmission or fails to acknowledge (ACK) receipt of the transmitted instance, or retransmission is otherwise triggered.

In some examples, at block 708, the RAP 404 can encrypt the transmitted instance of the matching data 326 using a key associated with the multiple allocation messages. Block 708 can be followed by block 706. In some examples, e.g., LTE, transmissions to a particular terminal are typically encrypted with a key specific to that terminal. In some examples, transmissions of matching data 326 are encrypted with a key used for such transmissions. For example, terminal 312, FIG. 3, can have knowledge of a terminal-specific key A and a shared key B. Terminal 314 can have knowledge of a terminal-specific key C and also the shared key B. The shared key can be, e.g., common to all terminals attached to a particular eNodeB or other RAP 404. In some examples, block 708 or other blocks herein, e.g., block 508, can include transmitting to at least two terminals the key associated with the multiple allocation messages, e.g., in respective transmissions encrypted with the respective terminal-specific keys.

Figure 8:
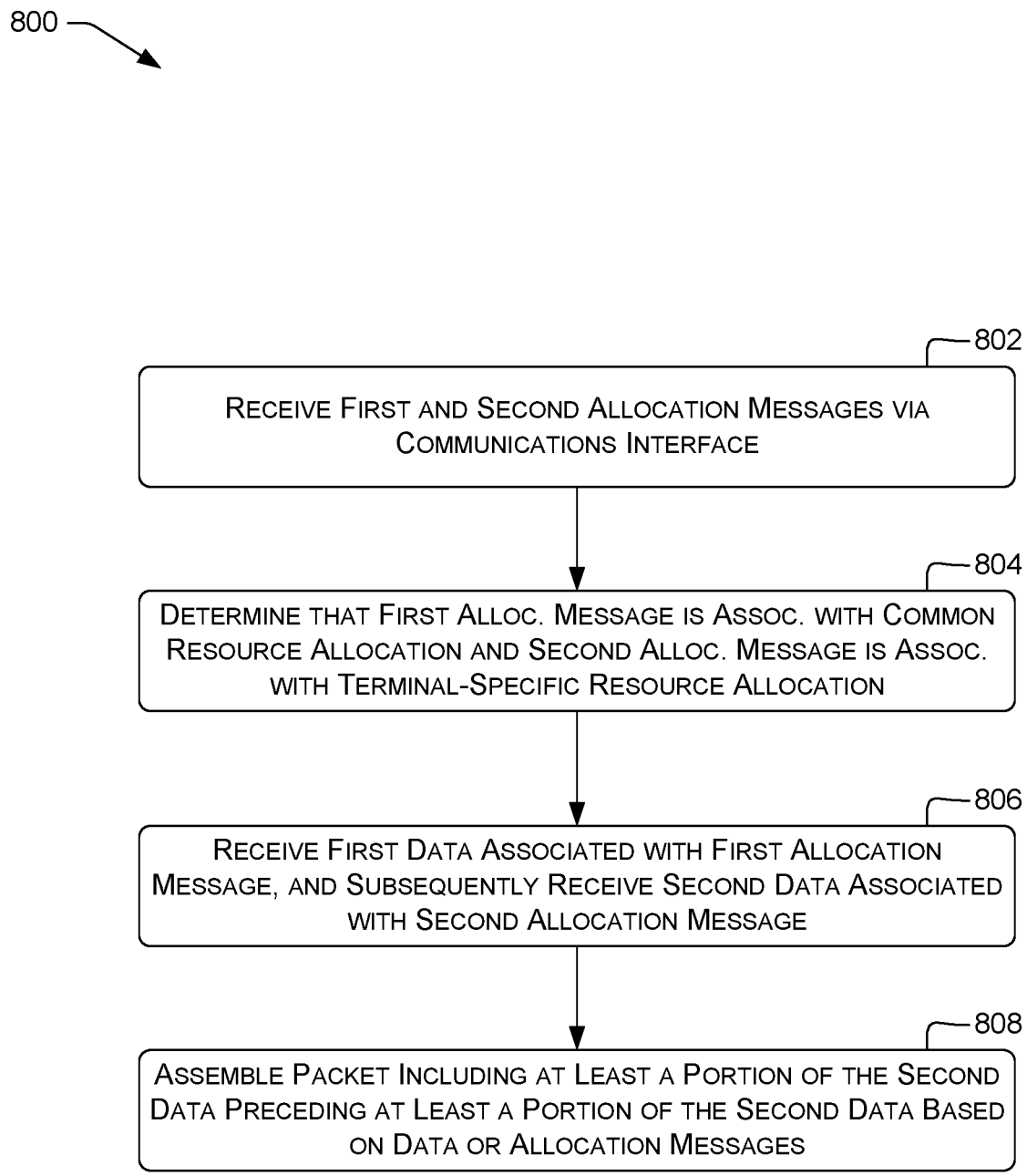
FIG. 8 illustrates an example process for receiving and processing overlaid and non-overlaid data, according to some implementations.

FIG. 8 illustrates an example process 800 for receiving overlaid data. Process 800 can be performed, e.g., by terminals 102, 104, 312, 314, or 402.

In some examples, at block 802, the assembly module 424 (or other components of terminal 402, and likewise throughout the remainder of this document) can receive a first allocation message and a second allocation message via the communications interface 412. The allocation messages can be received, e.g., by receiving DCIs on the PDCCH.

In some examples, at block 804, the assembly module 424 can determine that the first allocation message is associated with a common resource allocation and that the second allocation message is associated with a terminal-specific resource allocation. For example, a terminal-specific LTE DCI message can include a Radio Network Temporary Identifier (RNTI) value, e.g., a Cell RNTI (C-RNTI) value, indicating the terminal to which the DCI message is directed. In some examples, the RNTI is used to scramble a cyclic redundancy check (CRC) value or other checksum, or other portion of the data of an allocation message, so that terminals other than the intended recipient cannot successfully decode the allocation message. In some examples, the common resource allocation and the terminal-specific resource allocation are wireless resource allocations, e.g., PRBs.

In some examples, at block 804, the assembly module 424 can determine that the first allocation message does not include, or is not wholly or partly scrambled by, a terminal-specific RNTI or other terminal-specific identifier, and therefore that the first allocation message is associated with a common resource allocation. In some examples, the assembly module 424 can determine that the first allocation message includes, or is wholly or partly scrambled by, a common-allocation RNTI or other identifier associated with the common resource allocation, and therefore that the first allocation message is associated with a common resource allocation. In some examples, the assembly module 424 can determine that the second allocation message includes, or is wholly or partly scrambled by, a terminal-specific RNTI or other terminal-specific identifier, and therefore that the second allocation message is associated with a terminal-specific resource allocation.

In some examples, at block 806, the terminal 402 can receive first data associated with the first allocation message and, subsequently, receive second data associated with the second allocation message. Each of the first data and the second data can include, e.g., the payload of one or more allocated PRBs or other windows indicated in the allocation messages. Block 806 can include buffering at least one of the first data or the second data, e.g., in an assembly buffer.

In some examples, at block 808, the assembly module 424 can assemble a packet including at least a portion of the second data preceding at least a portion of the first data based at least in part on at least one of the first allocation message, the second allocation message, the first data, or the second data. For example, the first allocation message and the second allocation message can include fields indicating a relative order of the first data and the second data. Additionally or alternatively, at least one of the first data or the second data can include such field(s). In some examples, the first data and the second data can comprise respective LTE RLC Protocol Data Units (PDUs), each of which can include a respective Sequence Number (SN) field. The assembly module 424 can assemble the packet, e.g., based on the second data including a SN smaller than the SN of the first data, indicating that the second data precedes the first data in logical order.

Figure 9:
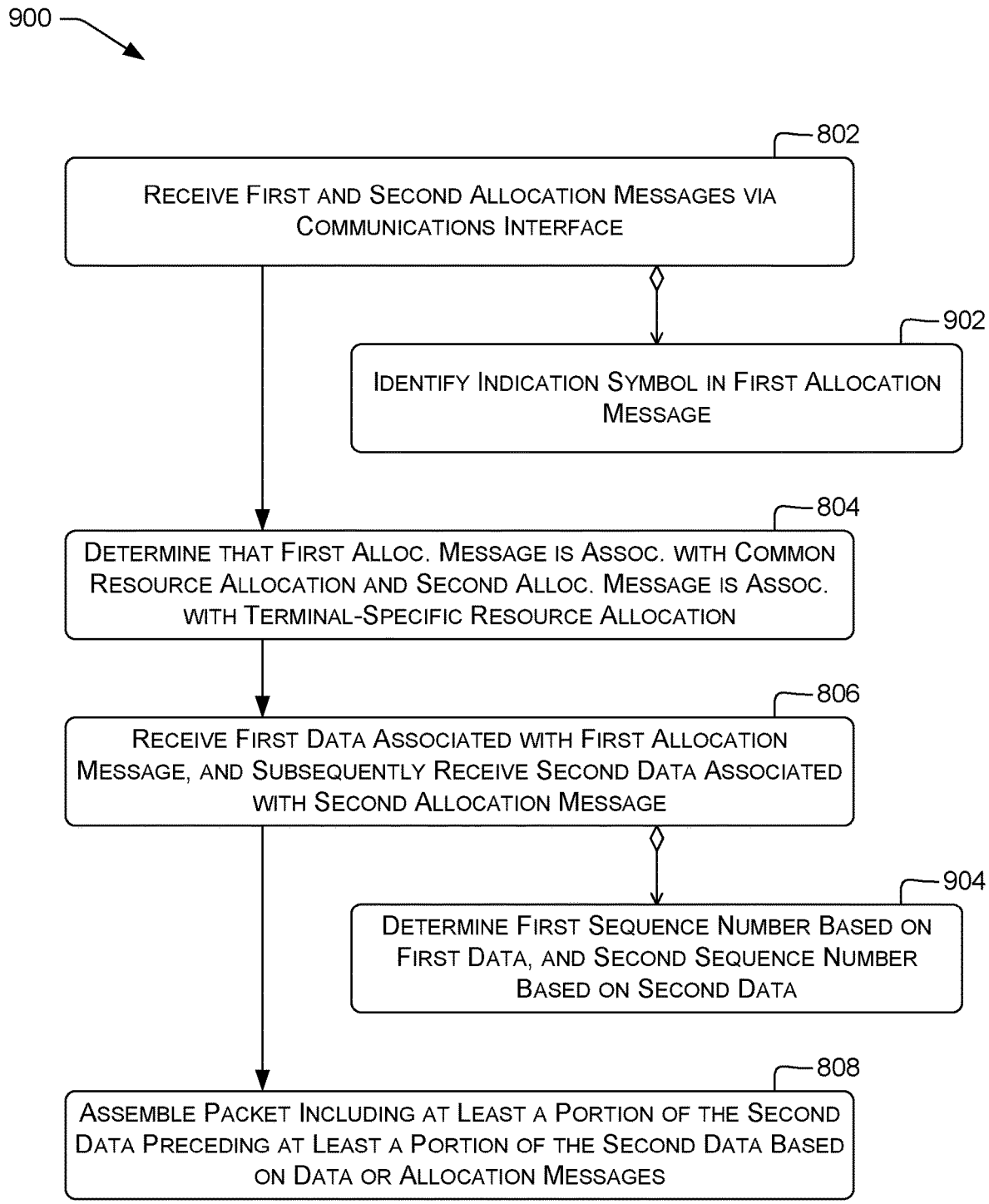
FIG. 9 illustrates an example process for identifying overlaid data, according to some implementations.

FIG. 9 illustrates an example process 900 for receiving overlaid data. Process 900 can be performed, e.g., by terminals 102, 104, 312, 314, or 402. Block 804 can include block 902. Block 808 can include block 904.

In some examples, at block 902, the assembly module 424 can identify an indication symbol in the first allocation message. The indication symbol can include, e.g., one or more bits or other data indicating that the first allocation message is associated with a shared resource allocation. In some examples, the indication symbol can include a predetermined RNTI or other identifier. In some examples, the indication symbol can be associated with a particular resource allocation in the allocation message, e.g., a (starting PRB, number of PRBs) tuple.

In some examples, at block 904, the assembly module 424 can determine a first sequence number, e.g., an RLC SN as noted above, based on the first data. The assembly module 424 can determine a second sequence number based on the second data. The assembly module 424 can then arrange the first data and the second data in the packet based at least in part on the first sequence number and the second sequence number, e.g., as discussed above with reference to block 808.

Figure 10:
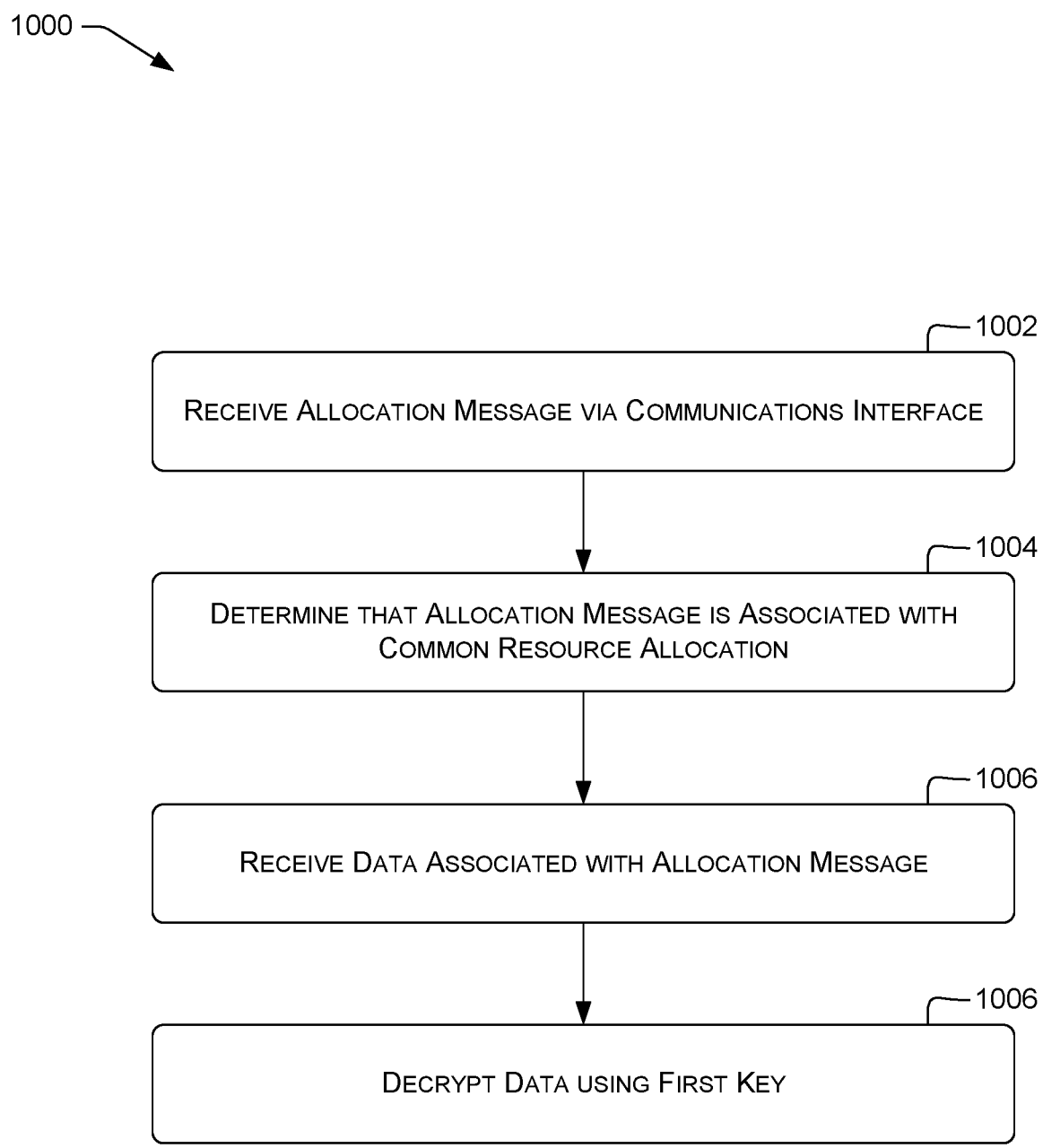
FIG. 10 illustrates an example process for decrypting overlaid data, according to some implementations.

FIG. 10 illustrates an example process 1000 for receiving and decrypting overlaid data. Process 1000 can be performed, e.g., by terminals 102, 104, 312, 314, or 402.

In some examples, at block 1002, the decryption module 426 (or other components of terminal 402, and likewise throughout the remainder of this document) can receive an allocation message via the communications interface 412. Examples of allocation messages are discussed above.

In some examples, at block 1004, the decryption module 426 can determine that the allocation message is associated with a common resource allocation. For example, the decryption module 426 can locate an indication symbol or other flags or values in the allocation message indicating that the allocation message is associated with a common resource allocation, e.g., as discussed herein with reference to blocks 506, 802, or 902.

In some examples, at block 1006, the decryption module 426 can receive, via the communications interface, data associated with the allocation message. For example, the data can include at least part of the payload of one or more allocated PRBs or other windows indicated in the allocation message.

In some examples, at block 1008, the decryption module 426 can decrypt the data using a first key. The first key can be associated with the common resource allocation. For example, as discussed above with reference to block 708, the first key can be a shared key B usable by multiple terminals 402 to decrypt matching data 326 transmitted according to the common resource allocation.

Figure 11:
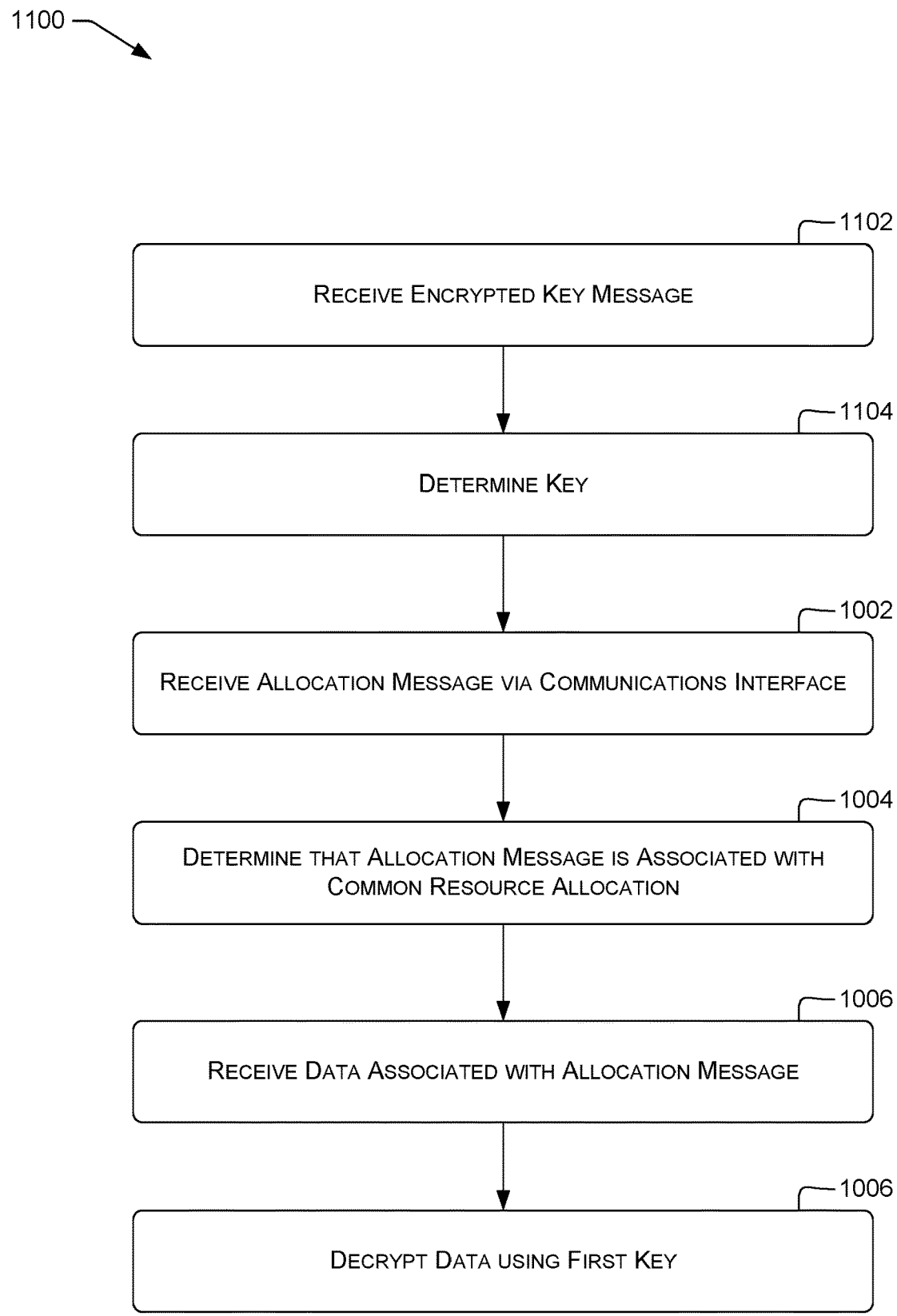
FIG. 11 illustrates an example process for determining a decryption key for overlaid data, according to some implementations.

FIG. 11 illustrates an example process 1100 for receiving and decrypting overlaid data. Process 1100 can be performed, e.g., by terminals 102, 104, 312, 314, or 402. Block 1002 can be preceded by blocks 1102 and 1104.

In some examples, at block 1102, the decryption module 426 can receive an encrypted key message. Continuing the example of block 708, the encrypted key message can be encrypted using terminal-specific key A. The encrypted key message can include shared key B. The decryption module 426 of terminal 312 can receive the encrypted key message, as terminal 312 possesses terminal-specific key A.

In some examples, at block 1104, the decryption module 426 can determine the first key by decrypting the encrypted key message. For example, the decryption module 426 of terminal 312 can decrypt the encrypted key message using the terminal-specific key A to extract the shared key B. Using process 1100 can permit providing a shared key or keys to terminals that will need the shared key without distributing the shared key to other terminals or revealing the shared key in cleartext to sniffers or other adversaries. In other examples, the decryption module 426 can conduct a key-exchange procedure with or via the base station to determine the second key, e.g., as discussed herein with reference to block 1210.

Figure 12:
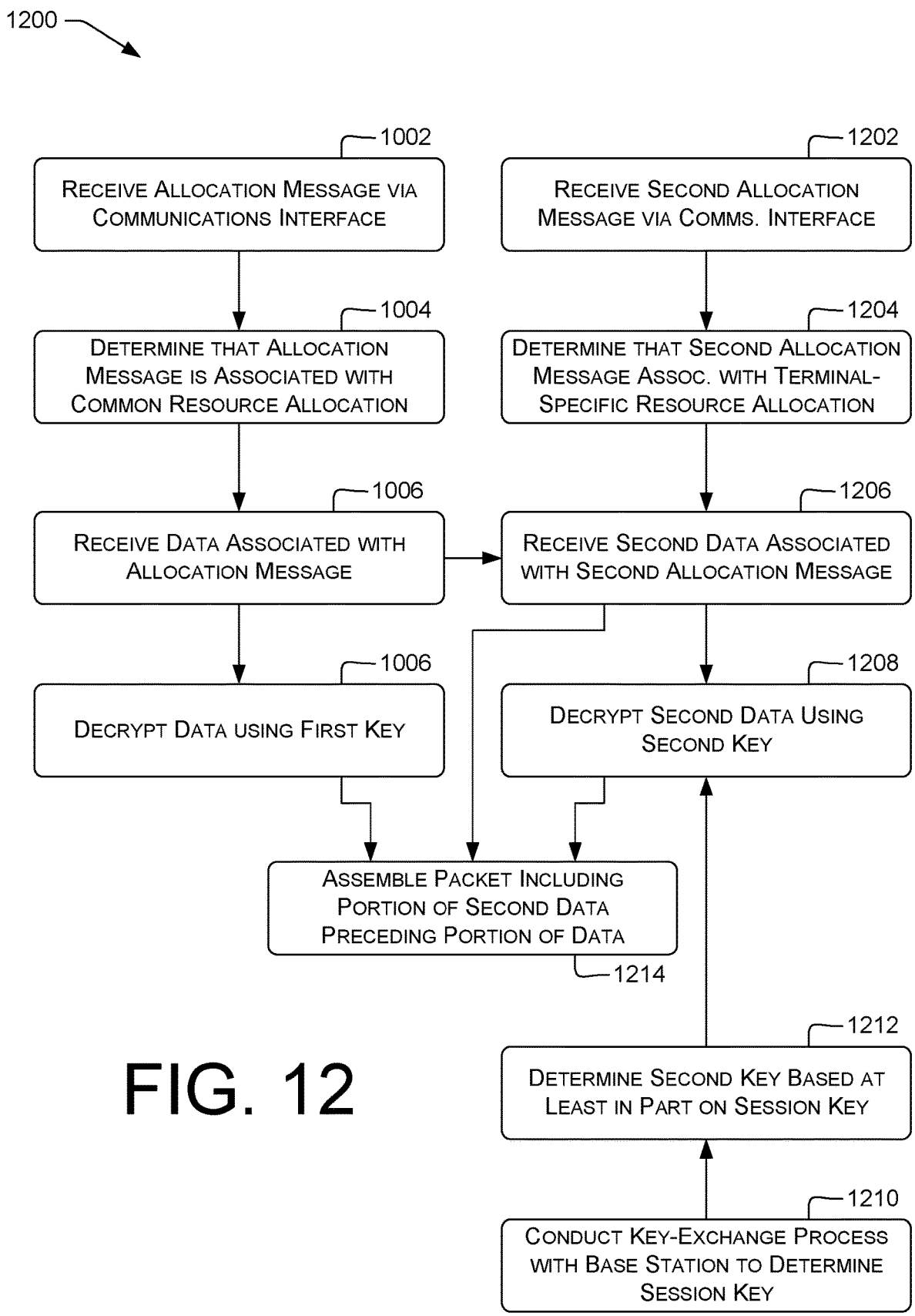
FIG. 12 illustrates an example process for determining a decryption key for overlaid data or for decrypting overlaid data, according to some implementations.

FIG. 12 illustrates an example process 1200 for receiving and decrypting overlaid data. Process 1200 can be performed, e.g., by terminals 102, 104, 312, 314, or 402. In some examples, block 1002 can be preceded or followed by, or can include, block 1202. In some examples, block 1004 can be preceded or followed by, or can include, block 1204. In some examples, block 1006 can be followed by block 1206.

In some examples, at block 1202, the decryption module 426 can receive a second allocation message via the communications interface. Examples are discussed above, e.g., with reference to block 802.

In some examples, at block 1204, the decryption module 426 can determine that the second allocation message is associated with a terminal-specific resource allocation. Examples are discussed above, e.g., with reference to block 804.

In some examples, at block 1206, after receiving the data at block 1006, the decryption module 426 can receive, via the communications interface, second data associated with the second allocation message. The second data can include, e.g., at least part of the payload of one or more PRBs or other windows, e.g., as discussed herein with reference to block 806 or block 1006. Block 1206 can be followed by block 1208 or block 1214.

In some examples, at block 1208, the decryption module 426 can decrypt the second data using a second key associated with the terminal-specific resource allocation. The second key can be different from the first key. For example, the second key can be a terminal-specific key A or C in the example of block 708. Block 1208 can be followed by block 1214. In some examples, block 1208 can be preceded by blocks 1210 and 1212.

In some examples, at block 1210, the decryption module 426 can conduct a key-exchange procedure with or via the base station to determine a session key. For example, the key-exchange procedure can include a Diffie-Hellman or LTE Authentication and Key Agreement (AKA) procedure, e.g., as set forth in ETSI TS 133 401. For example, the session key can be an LTE $K_{ASME}$ key. In some examples, block 1214 can include using a key derivation function (KDF). For example, block 1214 can include applying the KDF based on $K_{ASME}$ to determine an eNodeB key $K_{eNB}$, which can be the session key.

In some examples, at block 1212, the decryption module 426 can determine the second key for use in block 1208 based at least in part on the session key. For example, a KDF can be applied to the session key, e.g., $K_{eNB}$, to determine the second key, e.g., $K_{UPenc}$, a key for encryption of user-plane traffic. Block 1212 can be followed by block 1208.

In some examples, at block 1214, the decryption module 426 can assemble a packet including at least a portion of the second data preceding at least a portion of the first data based at least in part on at least one of the first allocation message, the second allocation message, the first data, or the second data. Examples are discussed above, e.g., with reference to FIGS. 8 and 9, e.g., block 808. In some examples, block 1006 can be followed by block 1214.

Example Clauses

A: A radio access provider communicatively connectable with multiple terminals, the radio access provider comprising: a processing unit; a communications interface communicatively connected to the processing unit; and one or more computer-readable media having thereon instructions executable to cause the processing unit to perform operations comprising: identifying matching data in two data flows associated with respective, different terminals; determining a common wireless-resource allocation associated with the matching data; determining multiple allocation messages associated with respective terminals, each allocation message indicating the common resource allocation; and transmitting the allocation messages to the respective terminals via the communications interface.

B: The radio access provider according to claim A, wherein the operations further comprise transmitting the matching data via the communications interface according to the common resource allocation.

C: The radio access provider according to claim A or B, wherein the operations further comprise identifying the matching data in respective subsets of the two data flows, wherein the respective subsets are associated with a same transmission window.

D: The radio access provider according to any of claims A-C, wherein the data flows comprise non-guaranteed-bit-rate (non-GBR) data flows.

E: The radio access provider according to any of claims A-D, wherein the two data flows comprise a first data flow and a second data flow, and the operations further comprise locating the matching data at a first position in a first packet associated with the first data flow and at a second, different position in a second packet associated with the second data flow.

F: The radio access provider according to any of claims A-E, wherein the allocation messages comprise respective Long Term Evolution (LTE) Downlink Control Information (DCI) messages.

G: The radio access provider according to any of claims A-F, wherein the operations further comprise: identifying the matching data in at least one additional data flow; and determining that a number of data flows in the at least one additional data flow meets a predetermined criterion.

H: The radio access provider according to any of claims A-G, wherein the operations further comprise identifying the matching data in at least one of an application header or an application payload of a data stream of at least one of the data flows.

I: The radio access provider according to any of claims A-H, wherein the operations further comprise: receiving a first instance of the matching data in a first data flow of the two data flows; receiving a second instance of the matching data in a second data flow of the two data flows; and transmitting exactly one transmitted instance of the matching data via the communications interface.

J: The radio access provider according to claim I, further comprising encrypting the transmitted instance of the matching data using a key associated with the multiple allocation messages.

K: The radio access provider according to claim J, further comprising transmitting to at least two terminals the key associated with the multiple allocation messages.

L: The radio access provider according to any of claims A-K, wherein the operations are performed prior to encryption of application-layer data.

M: A wireless communications device, comprising: a processing unit; a communications interface communicatively connected to the processing unit; and one or more computer-readable media having thereon instructions executable to cause the processing unit to perform operations comprising: receiving a first allocation message and a second allocation message via the communications interface; determining that the first allocation message is associated with a common resource allocation and that the second allocation message is associated with a terminal-specific resource allocation; receiving first data associated with the first allocation message and, subsequently, receiving second data associated with the second allocation message; and assembling a packet including at least a portion of the second data preceding at least a portion of the first data based at least in part on at least one of the first allocation message, the second allocation message, the first data, or the second data.

N: The wireless communications device according to claim M, wherein the operations further comprise identifying an indication symbol in the first allocation message.

O: The wireless communications device according to claim M or N, wherein the operations further comprise determining a first sequence number based on the first data and a second sequence number based on the second data and arranging the first data and the second data in the packet based at least in part on the first sequence number and the second sequence number.

P: The wireless communications device according to any of claims M-O, wherein the common resource allocation and the terminal-specific resource allocation are wireless resource allocations.

Q: A wireless communications device, comprising: a processing unit; a communications interface communicatively connected to the processing unit and communicatively connectable with a base station; and one or more computer-readable media having thereon instructions executable to cause the processing unit to perform operations comprising: receiving an allocation message via the communications interface; determining that the allocation message is associated with a common resource allocation; receiving, via the communications interface, data associated with the allocation message; and decrypting the data using a first key, the first key associated with the common resource allocation.

R: The wireless communications device according to claim Q, the operations further comprising: receiving a second allocation message via the communications interface; and determining that the second allocation message is associated with a terminal-specific resource allocation; and after receiving the data, receiving, via the communications interface, second data associated with the second allocation message.

S: The wireless communications device according to claim R, the operations further comprising decrypting the second data using a second key, the second key associated with the terminal-specific resource allocation.

T: The wireless communications device according to claim S, the operations further comprising conducting a key-exchange procedure with or via the base station to determine the second key.

U: The wireless communications device according to claim S or T, the operations further comprising: conducting a key-exchange procedure with or via the base station to determine a session key; and determining the second key based at least in part on the session key.

V: The wireless communications device according to any of claims R-U, the operations further comprising assembling a packet including at least a portion of the second data preceding at least a portion of the first data based at least in part on at least one of the first allocation message, the second allocation message, the first data, or the second data.

W: The wireless communications device according to any of claims Q-V, the operations further comprising: receiving an encrypted key message; and determining the first key by decrypting the encrypted key message.

CONCLUSION

Various aspects described above permit determining matching data in multiple communication sessions and transmitting fewer copies of that data. As discussed above, technical effects of various examples can include decreasing bandwidth consumed for downlink transmissions. This can reduce the number of bands or base stations required to provide service to a particular set of wireless network devices.

Example data transmissions or channels in FIG. 2 and example blocks in the diagrams of FIGS. 3-12 represent one or more operations that can be implemented in hardware, software, or a combination thereof to transmit or receive described data or conduct described exchanges. In the context of software, the illustrated blocks and exchanges represent computer-executable instructions that, when executed by one or more processing units, cause the processing units to transmit or receive the recited data. Generally, computer-executable instructions, e.g., stored in program modules that define operating logic, include routines, programs, objects, modules, components, data structures, and the like that perform particular functions or implement particular abstract data types. Except as expressly set forth herein, the order in which the transmissions or operations are described is not intended to be construed as a limitation, and any number of the described transmissions or operations can be combined in any order and/or in parallel to implement the processes. Moreover, structures or operations described with respect to a single server or device can be performed by each of multiple devices, independently or in a coordinated manner, except as expressly set forth herein.

Other architectures can be used to implement the described functionality, and are intended to be within the scope of this disclosure. Furthermore, although specific distributions of responsibilities are defined above for purposes of discussion, the various functions and responsibilities might be distributed and divided in different ways, depending on particular circumstances. Similarly, software can be stored and distributed in various ways and using different means, and the particular software storage and execution configurations described above can be varied in many different ways. Thus, software implementing the techniques described above can be distributed on various types of computer-readable media, not limited to the forms of memory that are specifically described.

The word "or" is used herein in an inclusive sense unless specifically stated otherwise. Accordingly, conjunctive language such as the phrases "X, Y, or Z" or "at least one of X, Y or Z," unless specifically stated otherwise, is to be understood as signifying that an item, term, etc., can be either X, Y, or Z, or a combination thereof.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims. Moreover, in the claims, any reference to a group of items provided by a preceding claim clause is a reference to at least some of the items in the group of items, unless specifically stated otherwise.

What is claimed is:

1. A wireless communications device, comprising:
   a processing unit;
   a communications interface communicatively connected to the processing unit; and
   one or more computer-readable media having thereon instructions executable to cause the processing unit to perform operations comprising:
     receiving at least one allocation message within a frequency band via the communications interface from a radio access provider of a wireless telecommunications network, the at least one allocation message relating to device-specific content of a first data flow from the radio access provider to the wireless communications device and relating to data overlay between the first data flow and a second data flow from the radio access provider to a different wireless communications device;
     determining, from the at least one allocation message, a common resource allocation and a terminal-specific resource allocation for a shared channel, the common resource allocation indicating a first frequency window of the frequency band for the radio access provider to transmit the data overlay for receipt by the wireless communications device and the different wireless communications device, the terminal-specific resource allocation indicating a second frequency window of the frequency band for the radio access provider to transmit the device-specific content for receipt by the wireless communications device;
     subsequently receiving, from the radio access provider, first downlink data and second downlink data in the shared channel, the first downlink data comprising the data overlay received within the first frequency window and the second downlink data comprising the device-specific content received within the second frequency window; and
     assembling a packet including at least a portion of the second downlink data and a portion of the first downlink data, the assembling based at least in part on a field indicating a relative order of the first downlink data and the second downlink data for the packet included in the at least one allocation message, the first downlink data, or the second downlink data.

2. The wireless communications device according to claim 1, wherein the operations further comprise identifying a symbol in the at least one allocation message indicating an association of the at least one allocation message with the common resource allocation.

3. The wireless communications device according to claim 2, wherein the symbol includes a predetermined Radio Network Temporary Identifier (RNTI) value.

4. The wireless communications device according to claim 3, wherein the symbol is associated with a resource allocation.

5. The wireless communications device according to claim 1, wherein the operations further comprise decrypting the first downlink data using a first key.

6. The wireless communications device according to claim 5, wherein the first key is associated with the common resource allocation and the operations further comprise:
   receiving an encrypted key message containing the first key, the encrypted key message being encrypted using a second key; and
   decrypting the encrypted key message using a second key, the second key being associated with the terminal-specific resource allocation.

7. The wireless communications device according to claim 5, wherein the operations further comprise conducting a key-exchange procedure with a base station to determine a second key, the second key being associated with the terminal-specific resource allocation.

8. The wireless communications device according to claim 1, wherein the operations further comprise:
   determining a first sequence number based on the field in the first downlink data and a second sequence number based on a second field in the second downlink data; and
   arranging the first downlink data and the second downlink data in the packet based at least in part on the first sequence number and the second sequence number.

9. A wireless communications device, comprising:
   a processing unit;
   a communications interface communicatively connected to the processing unit and communicatively connectable with a base station; and
   one or more computer-readable media having thereon instructions executable to cause the processing unit to perform operations comprising:
     receiving, via the communications interface, a first allocation message within a frequency band from a radio access provider of a wireless telecommunications network, the first allocation message relating to data overlay between a first data flow from the radio access provider to the wireless communications device and a second data flow from the radio access provider to a different wireless communications device;
     determining that the first allocation message is associated with a common resource allocation, the common resource allocation indicating a first frequency window of the frequency band for the radio access provider to transmit the data overlay for receipt by the wireless communications device and the different wireless communications device;

receiving, via the communications interface, first downlink data associated with the first allocation message within the first frequency window of a shared channel, the first downlink data comprising the overlay data;

decrypting the first downlink data using a first key, the first key being associated with the common resource allocation;

receiving, via the communications interface, second downlink data associated with a terminal-specific resource allocation within a second frequency window of the shared channel, the second downlink data comprising device-specific content of the first data flow; and assembling a packet including at least a portion of the second downlink data preceding at least a portion of the first downlink data, the assembling based at least in part on a relative order received via the communications interface of the first downlink data and the second downlink data for the packet.

10. The wireless communications device according to claim 9, the operations further comprising:
receiving, via the communications interface, a second allocation message; and
determining that the second allocation message is associated with the terminal-specific resource allocation.

11. The wireless communications device according to claim 10, the operations further comprising decrypting the second downlink data using a second key, the second key being associated with the terminal-specific resource allocation.

12. The wireless communications device according to claim 11, the operations further comprising:
conducting a key-exchange procedure via the base station to determine a session key; and
determining the second key based at least in part on the session key.

13. The wireless communications device according to claim 10, wherein the assembling is based at least in part on a field indicating the relative order in at least one of the first allocation message, the second allocation message, the first downlink data, or the second downlink data.

14. The wireless communications device according to claim 9, the operations further comprising:
receiving an encrypted key message; and
determining the first key by decrypting the encrypted key message.

15. A method comprising:
receiving, via a communications interface of a wireless communications device, a first allocation message within a frequency band from a radio access provider of a wireless telecommunications network, the first allocation message relating to data overlay between a first data flow from the radio access provider to the wireless communications device and a second data flow from the radio access provider to a different wireless communications device;

determining that the first allocation message is associated with a common resource allocation indicating a first frequency window of the frequency band for the radio access provider to transmit the data overlay for receipt by the wireless communications device and the different wireless communications device;

receiving, via the communications interface, first downlink data associated with the first allocation message within the first frequency window of a shared channel, the first downlink data comprising the overlay data; and decrypting the first downlink data using a first key, the first key associated with the common resource allocation;

receiving, via the communications interface, second downlink data associated with a terminal-specific resource allocation within a second frequency window of the shared channel, the second downlink data comprising device-specific content of the first data flow; and assembling a packet including at least a portion of the second downlink data and at least a portion of the first downlink data, the assembling based at least in part on a relative order received via the communications interface of the first downlink data and the second downlink data for the packet.

16. The method according to claim 15, further comprising:
receiving, via the communications interface, a second allocation message; and
determining that the second allocation message is associated with the terminal-specific resource allocation.

17. The method according to claim 16, further comprising decrypting the second downlink data using a second key, the second key being associated with the terminal-specific resource allocation.

18. The method according to claim 17, further comprising:
conducting a key-exchange procedure via a base station in communication with the communications interface to determine a session key; and
determining the second key based at least in part on the session key.

19. The method according to claim 16, further comprising wherein the assembling is based at least in part on a field indicating the relative order in at least one of the first allocation message, the second allocation message, the first downlink data, or the second downlink data.

20. The method according to claim 15, further comprising:
receiving an encrypted key message; and
determining the first key by decrypting the encrypted key message.

* * * * *